US010097946B2

(12) United States Patent
Stanwood et al.

(10) Patent No.: US 10,097,946 B2
(45) Date of Patent: Oct. 9, 2018

(54) SYSTEMS AND METHODS FOR COOPERATIVE APPLICATIONS IN COMMUNICATION SYSTEMS

(71) Applicant: Taiwan Semiconductor Manufacturing Co., Ltd., Hsinchu (TW)

(72) Inventors: Kenneth L. Stanwood, San Diego, CA (US); David Gell, San Diego, CA (US); Yiliang Bao, San Diego, CA (US); Warren Roddy, San Diego, CA (US)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 382 days.

(21) Appl. No.: 13/653,239

(22) Filed: Oct. 16, 2012

(65) Prior Publication Data
US 2013/0166623 A1 Jun. 27, 2013

Related U.S. Application Data

(60) Provisional application No. 61/658,774, filed on Jun. 12, 2012, provisional application No. 61/579,324, filed on Dec. 22, 2011.

(51) Int. Cl.
*G06F 15/16* (2006.01)
*H04W 4/00* (2018.01)

(52) U.S. Cl.
CPC .................... *H04W 4/00* (2013.01)

(58) Field of Classification Search
CPC ........... H04W 72/042; H04W 72/0453; H04W 72/0413; H04W 72/0406; H04W 72/1278;
(Continued)

(56) References Cited

U.S. PATENT DOCUMENTS 9,232,525 B2   1/2016 Meredith
9,479,807 B1 * 10/2016 Bugajski ............ H04N 21/2402
(Continued)

FOREIGN PATENT DOCUMENTS

EP    2291043       3/2011
GB    2481659 A    1/2012
(Continued)

OTHER PUBLICATIONS

Fitchard. "Examining Intel's conception of the radio access network." Connected Planet. Jun. 16, 2011, 3 pages. Retrieved from http://connectedplanetonline.com/residential_services/news/Examining-Intels-conception-of-the-radio-access-network-0616/.
(Continued)

*Primary Examiner* — Younes Naji
*Assistant Examiner* — Da T Ton
(74) *Attorney, Agent, or Firm* — JCIPRNET

(57) ABSTRACT

Systems and methods provide communications between applications in terminal nodes and applications agents in access nodes. The APP-agent cooperative communications can be used to improve quality of experience for users or the terminal nodes. An access node may, for example, have parameterized scheduling system that incorporates information from the APP-agent cooperative communications in determining scheduling parameters. An application at a terminal node may, for example, modify requests for communication based on information about communication capabilities received from an access node. For APP-agent cooperative communications for multiple applications, an access node may include a master application agent to facilitate and coordinate communications to specific application agents that address APP-agent cooperative communications for specific applications. Similarly, a terminal node
(Continued)

may use a master application and specifications for APP-agent cooperative communications.

62 Claims, 7 Drawing Sheets

(58) Field of Classification Search
CPC ... H04W 72/082; H04W 72/10; H04W 72/02;
H04W 72/1242; H04W 72/1226; H04W
88/02; H04W 88/08; H04W 4/02; H04W
28/0278; H04W 28/20; H04W 28/22;
H04W 36/0033; H04W 36/0088; H04W
36/20; H04W 48/14; H04W 84/045;
H04W 92/10; H04L 67/10; H04L 67/18;
H04L 67/2823; H04L 67/32; H04L 65/60;
H04L 65/608; H04L 65/4076; H04L
65/80; H04L 1/0027; H04L 1/1854; H04L
5/0064; H04L 65/4069; H04B 7/0632;
H04B 7/2659
USPC ............ 709/201–211, 217–219, 231–235;
370/252, 238, 241, 329, 338, 345, 389
See application file for complete search history.

(56) References Cited

U.S. PATENT DOCUMENTS

| | | |
|---|---|---|
| 2001/0047423 A1 | 11/2001 | Shao |
| 2004/0033806 A1 | 2/2004 | Daniel et al. |
| 2005/0054289 A1* | 3/2005 | Salazar et al. .................. 455/39 |
| 2005/0055708 A1 | 3/2005 | Gould |
| 2006/0264219 A1 | 11/2006 | Satt |
| 2006/0286985 A1* | 12/2006 | Pedersen ............... H04W 36/02 455/445 |
| 2007/0174428 A1* | 7/2007 | Lev Ran ................. G06F 9/546 709/218 |
| 2007/0268860 A1* | 11/2007 | Taneja ................ H04L 27/2608 370/329 |
| 2008/0186918 A1* | 8/2008 | Tinnakornsrisuphap ................... H04L 47/10 370/331 |
| 2008/0225706 A1 | 9/2008 | Lange et al. |
| 2009/0238098 A1 | 9/2009 | Cai |
| 2009/0252134 A1 | 10/2009 | Schlicht et al. |
| 2010/0002692 A1 | 1/2010 | Bims |
| 2010/0177650 A1 | 7/2010 | Wittgreffe |
| 2010/0203954 A1* | 8/2010 | Burke .................... G07F 17/32 463/25 |
| 2010/0268836 A1 | 10/2010 | Jabri et al. |
| 2011/0043357 A1 | 2/2011 | Peatfield |
| 2011/0179320 A1* | 7/2011 | Quere et al. .................. 714/712 |
| 2011/0209201 A1 | 8/2011 | Chollat |
| 2011/0275379 A1 | 11/2011 | Hakola |
| 2011/0307900 A1 | 12/2011 | Fatehpuria |
| 2012/0155398 A1* | 6/2012 | Oyman et al. ................ 370/329 |
| 2012/0163203 A1 | 6/2012 | Wilkinson et al. |
| 2013/0097309 A1* | 4/2013 | Ma .................... H04L 29/08099 709/224 |
| 2013/0100819 A1 | 4/2013 | Anchan et al. |

FOREIGN PATENT DOCUMENTS

| | | |
|---|---|---|
| WO | 2002/073366 A2 | 9/2002 |
| WO | 2006/136926 A2 | 12/2006 |
| WO | 2010104921 | 9/2010 |
| WO | 2010/112074 A1 | 10/2010 |

OTHER PUBLICATIONS

Schulzrinne et al. "RTP Profile for Audio and Video Conferences with Minimal Control." The Internet Society RFC 3551. Jul. 2003, 38 pages.
Felix. "Introduction to Video Transcoding of MCLAB Seminar Series." 42 pages. Date unknown.
Ortiva Wireless, Inc.. "Defining Quality of Experience for Video Delivered over Mobile Networks." 4 pages. Date unknown.
Cisco Systems, Inc. "Optimizing Enterprise Video Over Wireless LAN." White Paper, 11 pages. 2010.
International Search Report and Written Opinion for related international application No. PCT/US13/043095, dated Sep. 19, 2013, in 13 pages.
International Search Report and Written Opinion for related international application No. PCT/US13/043042, dated Sep. 19, 2013, in 13 pages.
Aloui et al. "Architecture for Mobile Business based on mobile agent." IEEE 2012 International Conference on Multimedia Computing and Systems. May 10, 2012. pp. 954-958.
Wirth et al. "Advanced Downlink LTE Radio Resource Management for HTTP-Streaming." Proceedings of the 20th ACM International Conference on Multimedia. Oct. 29-Nov. 2, 2012. pp. 1037-1040.
"Search Report of Europe Counterpart Application", dated Dec. 20, 2017, p. 1-p. 8.

* cited by examiner

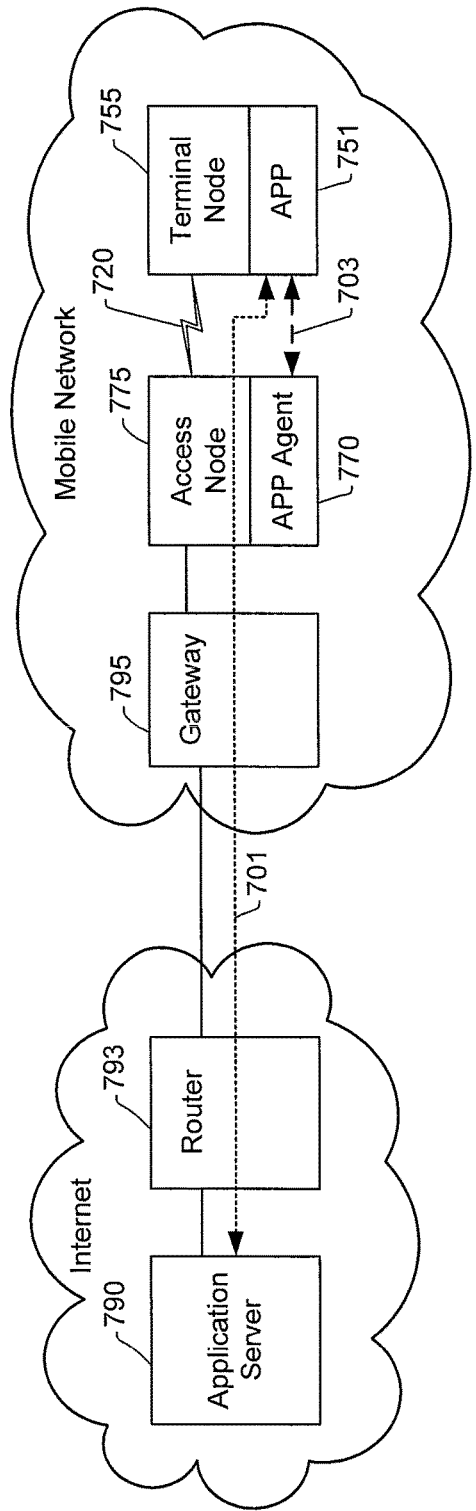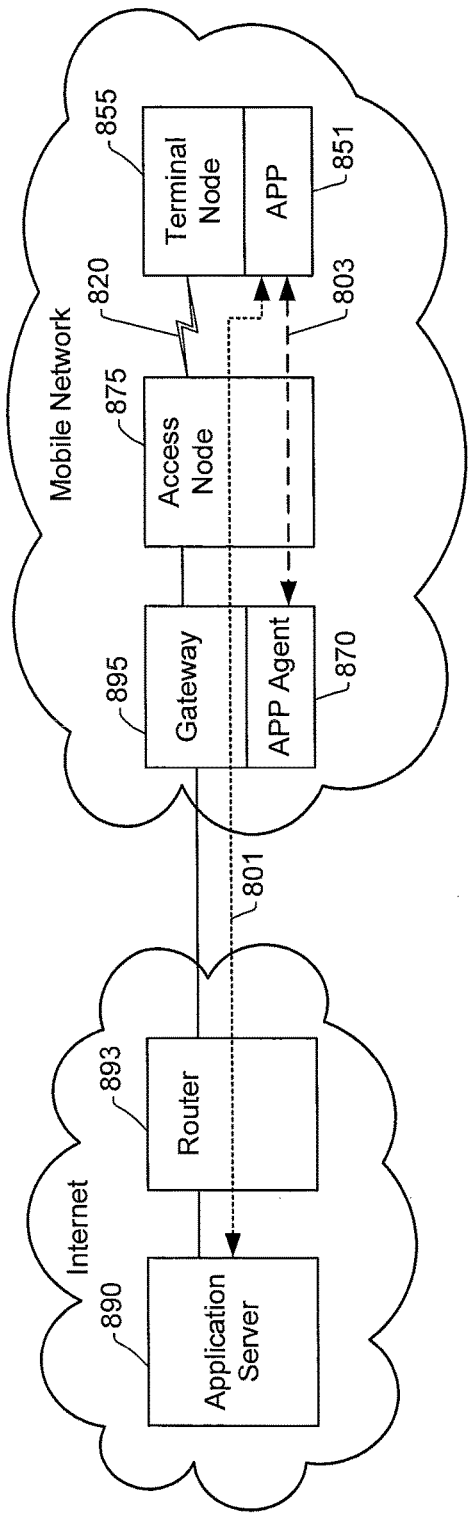
FIG. 7
FIG. 8

SYSTEMS AND METHODS FOR COOPERATIVE APPLICATIONS IN COMMUNICATION SYSTEMS

CROSS-REFERENCE TO RELATED APPLICATIONS

This application claims the benefit of U.S. provisional application Ser. No. 61/658,774, filed Jun. 12, 2012 and titled "System and Method for Cooperative Applications in a Communication System" and U.S. provisional application Ser. No. 61/579,324, filed Dec. 22, 2011 and titled "Congestion Induced Video Scaling," which are hereby incorporated by reference.

BACKGROUND

The present invention generally relates to the field of communication systems and to systems and methods for cooperative applications in communication systems.

In a communication network, such as an Internet Protocol (IP) network, each node and subnet has limitations on the amount of data that can be effectively transported at any given time. In a wired network, this is often a function of equipment capability. For example, a gigabit Ethernet link can transport no more than 1 billion bits of traffic per second. In a wireless network the capacity is limited by the channel bandwidth, the transmission technology, and the communication protocols used. A wireless network is further constrained by the amount of spectrum allocated to a service area and the quality of the signal between the sending and receiving systems. Because these aspects can be dynamic, the capacity of a wireless system may vary over time.

Historically, communication systems have segregated traffic by classes of service (CoS) in the core, such as in a packet gateway (P-GW) in an LTE system. This has the benefit that operator provided services such as voice and video from the operator's own or coordinated content delivery network (CDN) are able to be given quality of service (QoS) guarantees such as guaranteed bit rates (GBR). Traffic not associated with operator provided services is typically less differentiated, leading to heterogeneous traffic grouped into the same CoS. Further, this traffic is often provided resources on a best effort basis, ignoring the QoS needs of the specific application generating the traffic, and ignoring the quality of experience (QoE) perceived by the end user.

Additional communication traffic may be from over-the-top (OTT) services, that is, services that are not operator provided or coordinated. Skype voice over internet protocol (VoIP), YouTube progressive download video, Netflix streaming video, and Pandora radio streaming audio are examples of OTT services. OTT voice and video services tend to be grouped together as best effort traffic along with email, social networking, and file transfer. When a network becomes congested, the OTT services are typically all treated the same regardless of the impact in perceived quality by the end user. They are typically scheduled as the same CoS. Additionally, OTT services are typically grouped into the same logical bearer. In today's communications systems, admission control is performed on a logical bearer basis without regard to the mix of services on the bearer. Consequently, real-time services such as voice, streaming video, and streaming audio are perceived to have a substantial degradation in QoE relative to non-real-time services such as email.

SUMMARY

Systems and methods for cooperative applications in communication systems are provided. In one aspect, the invention provides an access node including: a transceiver module configured to communicate with a terminal node; a backhaul module configured to provide communications with an application server; an application agent configured to receive information about an application from the terminal node; and a scheduler module configured to receive downlink packets via the backhaul module, group the downlink packets into queues, and schedule the downlink packets for transmission by the transceiver module utilizing scheduler parameters, scheduler parameters based at least in part on the information about the application.

In another aspect, the invention provides an access node including: a transceiver module configured to communicate with terminal nodes; a processor coupled to the transceiver and configured to receive from the terminal nodes information about applications at the terminal nodes, receive from the terminal nodes requests for data from one or more application servers, transmit the requests for data to the application servers, receive data from the application servers in response to the requests for data, and transmit the data received from the application servers to the terminal nodes, the data transmitted with characteristics that utilize the information about the applications, the processor including a master application agent configured to receive the information about the applications and process information common to the applications, and specific application agents coupled to the master application agent and configured to receive the information about applications for subsets of the applications; and a backhaul module coupled to the processor and configured to provide communications with the application servers.

In another aspect, the invention provides an access node including: a transceiver module configured to communicate with a terminal node; a processor coupled to the transceiver and configured to receive from the terminal node information about an application at the terminal node; receive from the terminal node a request for data from an application server; transmit the request for data to the application server; receive data from the application server in response to the request for data; and transmit the data received from the application server to the terminal node, the data transmitted with characteristics that utilize the information about the application; and a backhaul module coupled to the processor and configured to provide communications with the application server.

In another aspect, the invention provides a method for use in operating an access node that provides communications between a terminal node and an application server. The method includes receiving from the terminal node information about an application at the terminal node, the information being received by an application agent in the access node; receiving from the terminal node a request for data from the application server; transmitting the request for data to the application server; receiving data from the application server in response to the request for data; and transmitting the data received from the application server to the terminal node, the data transmitted with characteristics that utilize the information about the application.

In another aspect, the invention provides a terminal node including: a transceiver module configured to communicate with an access node; and a processor coupled to the transceiver and configured to request communications from an application server via an access node, transmit information about the application to the access node, the information about the application being for use by the access node in communicating with the terminal node, receive from the access node information about capabilities for communication with the terminal node, and request further communications from the application server via the access node, the further request having characteristics that utilize the information about capabilities for communication.

In another aspect, the invention provides a method for use with an application in a terminal node. The method includes: requesting communications from an application server via an access node; transmitting information about the application to the access node, the information about the application being for use by the access node in communicating with the terminal node; receiving from the access node information about capabilities for communication with the terminal node; and requesting further communications from the application server via the access node, the further request having characteristics that utilize the information about capabilities for communication.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 7 is a block diagram of a communication system with application agents and applications in accordance with aspects of the invention;

FIG. 8 is a block diagram of another communication system with application agents and applications in accordance with aspects of the invention.

DETAILED DESCRIPTION

Systems and methods for communication systems having scheduling and admission control functions that are aware of application needs are provided. Cooperation and communication between user equipment applications and application-aware base stations (or other network nodes) can improver users' quality of experience (QoE). The systems and method are particularly useful in capacity and spectrum constrained, multiple-access communication systems. The systems and methods disclosed herein can be used with classes of service that contain data streams or flows from heterogeneous applications.

The systems and methods disclosed herein can be applied to various capacity-limited communication systems, including wireline and wireless technologies. For example, the systems and methods disclosed herein can be used with Cellular 2G, 3G, 4G (including Long Term Evolution (LTE), LTE Advanced, and WiMAX), cellular backhaul, Wi-Fi, Ultra Mobile Broadband (UMB), cable modem, and other point-to-point or point-to-multipoint wireline or wireless technologies. For concise exposition, various embodiments are described using terminology and organization of particular technologies and standards. However, the systems and methods described herein are broadly applicable to other technologies and standards.

Figure 1:
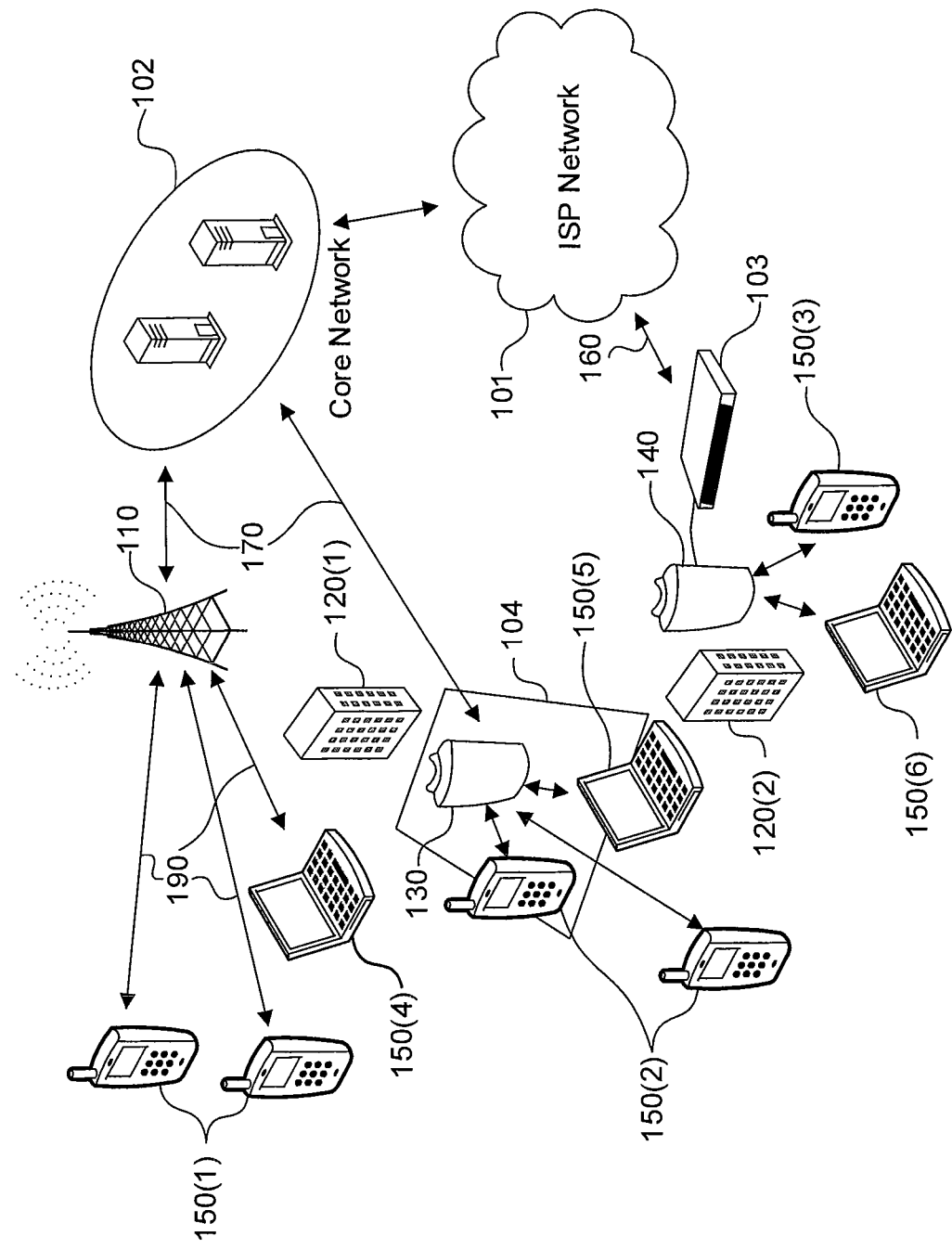
FIG. 1 is a block diagram of a communication network in which systems and methods disclosed herein can be implemented in accordance with aspects of the invention.

FIG. 1 is a block diagram of a communication network in which systems and methods disclosed herein can be implemented in accordance with aspects of the invention. A macro base station 110 is connected to a core network 102 through a backhaul connection 170. In an embodiment, the backhaul connection 170 is a bidirectional link or two unidirectional links. The direction from the core network 102 to the macro base station 110 is referred to as the downstream or downlink (DL) direction. The direction from the macro base station 110 to the core network 102 is referred to as the upstream or uplink (UL) direction. Subscriber stations 150 (1) and 150(4) can connect to the core network 102 through the macro base station 110. Wireless links 190 between subscriber stations 150 and the macro base station 110 are bidirectional point-to-multipoint links, in an embodiment. The direction of the wireless links 190 from the macro base station 110 to the subscriber stations 150 is referred to as the downlink or downstream direction. The direction of the wireless links 190 from the subscriber stations 150 to the macro base station 110 is referred to as the uplink or upstream direction. Subscriber stations are sometimes referred to as user equipment (UE), users, user devices, handsets, terminal nodes, or user terminals and are often mobile devices such as smart phones or tablets. The subscriber stations 150 access content over the wireless links 190 using base stations, such as the macro base station 110, as a bridge. That is to say, the base stations generally pass user application data and any user application control messages between the subscriber stations 150 and the core network 102 without the base station being a destination for the data and control messages or a source of the data and control messages.

In the network configuration illustrated in FIG. 1, an office building 120(1) causes a coverage shadow 104. A pico station 130 can provide coverage to subscriber stations 150(2) and 150(5) in the coverage shadow 104. The pico station 130 is connected to the core network 102 via a backhaul connection 170. The subscriber stations 150(2) and 150(5) may be connected to the pico station 130 via links that are similar to or the same as the wireless links 190 between subscriber stations 150(1) and 150(4) and the macro base station 110.

In office building 120(2), an enterprise femtocell 140 provides in-building coverage to subscriber stations 150(3) and 150(6). The enterprise femtocell 140 can connect to the core network 102 via an internet service provider network 101 by utilizing a broadband connection 160 provided by an enterprise gateway 103.

To aid in allocating scarce communication resources, prior communication systems have segregated traffic by classes of service (CoS) in the core network, such as in a packet gateway (P-GW) in an LTE system. Traffic within a CoS is often treated similarly for the purpose of scheduling resource allocations. Traffic in different CoS is often treated separately for the purpose of scheduling resource allocations. This allows operator provided services, such as voice and video from the operator's own or coordinated content delivery network (CDN), to be given QoS guarantees such as guaranteed bit rates (GBR).

Traffic not associated with operator provided services may be referred to as over-the-top (OTT) traffic. Prior systems typically have little or no differentiation between various types of OTT traffic. Thus, heterogeneous traffic may be grouped into the same CoS. Further, this traffic is often provided resources on a best effort basis with, for example, no guaranteed bit rates. Thus, prior systems ignore QoS needs of the specific application generating the OTT traffic and ignore the quality of experience (QoE) perceived by the end user. In particular, OTT voice and video services such as Skype voice over IP (VoIP), YouTube progressive download video, Netflix streaming video, Facetime conversational video, and Pandora radio streaming audio may have been grouped together as best effort traffic along with email, social networking, and file transfer. When the network becomes congested, these services are typically all treated the same regardless of the impact in perceived quality by the user. Consequently, real-time services (for example, voice, streaming video, and streaming audio) are perceived to have a substantial degradation in QoE relative to non-real-time services (for example, email).

The subscriber stations 150 and communication nodes in the network of FIG. 1 (such as the macro base station 110, the pico station 130, the enterprise gateway 103, the enterprise femtocell 140, devices in the core network 102, and devices in the internet service provider network 101) may communicate application related information. Cooperation between applications in the subscriber stations and application agents in the communication nodes can improve performance of the communication network including the user experience. The application related information can be derived through the inspection of packets passing through the communication nodes. For many applications there may be additional information, such as client side buffer occupancy, residing in an application in a subscriber station that may allow for more efficient or improved communications. Similarly, there may be information, such as congestion state information, available in a communication node, that could aid an application in making more intelligent resource requests which would, in turn, lead to improved performance by the communication node, for example, in scheduler and admission control functions. For example, the communication system may use application information and congestion information to improve communication channel resource allocation and to determine which sessions to admit, deny, or modify.

Application related communication or cooperation between client side applications and communication node scheduling and admission control functions can improve QoE for users. Application related communication and cooperation can improve QoE even when QoS resource guarantees are available. For example, the resource guarantees may not comprehend instantaneous conditions such as congestion, peak versus average bit rates, and heterogeneity of data between applications.

Figure 2:
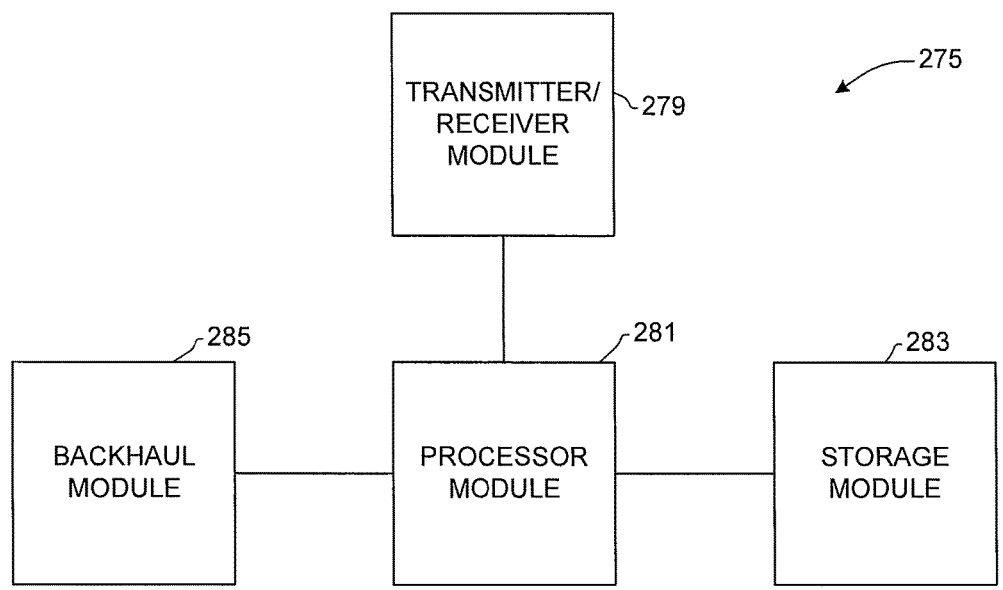
FIG. 2 is a block diagram of an access node in accordance with aspects of the invention.

FIG. 2 is a functional block diagram of an access node 275 in accordance with aspects of the invention. In various embodiments, the access node 275 may be a mobile WiMAX base station, a global system for mobile (GSM) wireless base transceiver station (BTS), a Universal Mobile Telecommunications System (UMTS) NodeB, an LTE evolved Node B (eNB or eNodeB), a cable modem head end, or other wireline or wireless access node of various form factors. For example, the macro base station 110, the pico station 130, or the enterprise femtocell 140 of FIG. 1 may be provided, for example, by the access node 275 of FIG. 2. The access node 275 includes a processor module 281. The processor module 281 is coupled to a transmitter-receiver (transceiver) module 279, a backhaul interface module 285, and a storage module 283.

The transmitter-receiver module 279 is configured to transmit and receive communications with other devices. In many embodiments, the communications are transmitted and received wirelessly. In such embodiments, the access node 275 generally includes one or more antennae for transmission and reception of radio signals. In other embodiments, the communications are transmitted and received over physical connections such as wires or optical cables. The communications of the transmitter-receiver module 279 may be with terminal nodes.

The backhaul interface module 285 provides communication between the access node 275 and a core network. The communication may be over a backhaul connection, for example, the backhaul connection 170 of FIG. 1. Communications received via the transmitter-receiver module 279 may be transmitted, after processing, on the backhaul connection. Similarly, communication received from the backhaul connection may be transmitted by the transmitter-receiver module 279. Although the access node 275 of FIG. 2 is shown with a single backhaul interface module 285, other embodiments of the access node 275 may include multiple backhaul interface modules. Similarly, the access node 275 may include multiple transmitter-receiver modules. The multiple backhaul interface modules and transmitter-receiver modules may operate according to different protocols.

The processor module 281 can process communications being received and transmitted by the access node 275. The storage module 283 stores data for use by the processor module 281. The storage module 283 may also be used to store computer readable instructions for execution by the processor module 281. The computer readable instructions can be used by the access node 275 for accomplishing the various functions of the access node 275. In an embodiment, the storage module 283 or parts of the storage module 283 may be considered a non-transitory machine readable medium. For concise explanation, the access node 275 or embodiments of it are described as having certain functionality. It will be appreciated that in some embodiments, this functionality is accomplished by the processor module 281 in conjunction with the storage module 283, transmitter-receiver module 279, and backhaul interface module 285. Furthermore, in addition to executing instructions, the processor module 281 may include specific purpose hardware to accomplish some functions.

The access node 275 may communicate application related information with other devices. The access node 275 may receive application related information from other devices, transmit application related information to other devices, or both. For example, an application in a terminal node may cooperatively operate with the access node 275 to improve QoE for the user of the terminal node.

Figure 3:
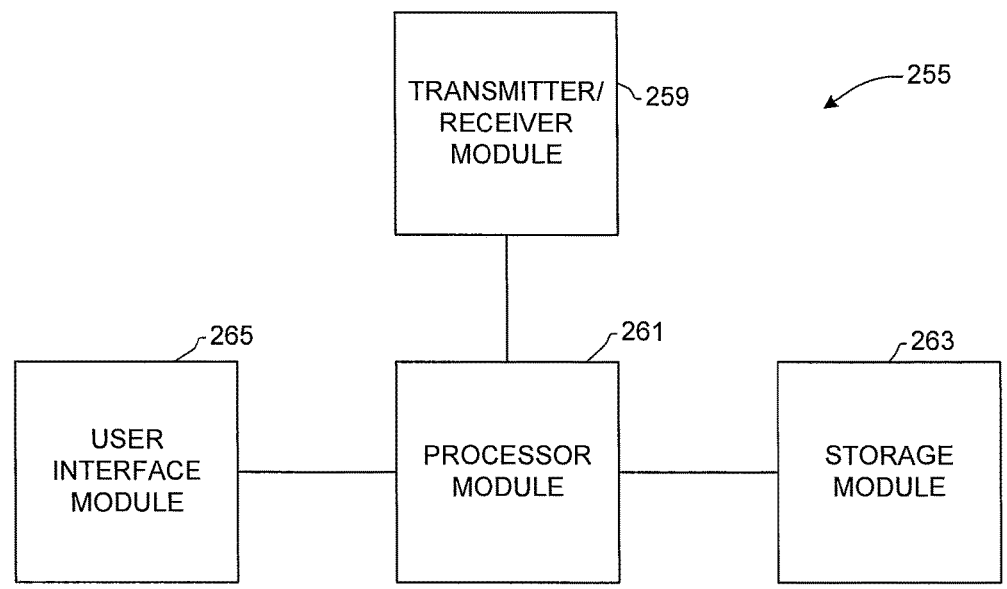
FIG. 3 is a block diagram of a terminal node in accordance with aspects of the invention.

FIG. 3 is a functional block diagram of a terminal node 255 in accordance with aspects of the invention. In various embodiments, the terminal node 255 may be a mobile WiMAX subscriber station, a GSM cellular phone, a UMTS cellular phone, an LTE user equipment, a cable modem, or other wireline or wireless terminal node of various form factors. The subscriber stations 150 of FIG. 1 may be provided, for example, by the terminal node 255 of FIG. 3. The terminal node 255 includes a processor module 261. The processor module 261 is coupled to a transmitter-receiver module (transceiver) 259, a user interface module 265, and a storage module 263.

The transmitter-receiver module 259 is configured to transmit and receive communications with other devices. For example, the transmitter-receiver module 259 may communicate with the access node 275 of FIG. 2 via its transmitter-receiver module 279. In embodiments where the communications are wireless, the terminal node 255 generally includes one or more antennae for transmission and reception of radio signals. In other embodiments, the communications are transmitted and received over physical connections such as wires or optical cables. Although the terminal node 255 of FIG. 3 is shown with a single transmitter-receiver module 259, other embodiments of the terminal node 255 may include multiple transmitter-receiver modules. The multiple transmitter-receiver modules may operate according to different protocols.

The terminal node 255, in many embodiments, provides data to and receives data from a person (user). Accordingly, the terminal node 255 includes the user interface module 265. The user interface module 265 includes modules for communicating with a person. The user interface module 265, in an embodiment, includes a speaker and a microphone for voice communications with the user, a screen for providing visual information to the user, and a keypad for accepting alphanumeric commands and data from the user. In some embodiments, a touch screen may be used in place of or in combination with the keypad to allow graphical inputs in addition to alphanumeric inputs. In an alternative embodiment, the user interface module 265 includes a computer interface, for example, a universal serial bus (USB) interface, to interface the terminal node 255 to a computer. For example, the terminal node 255 may be in the form of a dongle that can be connected to a notebook computer via the user interface module 265. The combination of computer and dongle may also be considered a terminal node. The user interface module 265 may have other configurations and include functions such as vibrators, cameras, and lights.

The processor module 261 can process communications being received and transmitted by the terminal node 255. The processor module 261 can also process inputs from and outputs to the user interface module 265. The storage module 263 stores data for use by the processor module 261. The storage module 263 may also be used to store computer readable instructions for execution by the processor module 261. The computer readable instructions can be used by the terminal node 255 for accomplishing the various functions of the terminal node 255. In an embodiment, the storage module 283 or parts of the storage module 283 may be considered a non-transitory machine readable medium. For concise explanation, the terminal node 255 or embodiments of it are described as having certain functionality. It will be appreciated that in some embodiments, this functionality is accomplished by the processor module 261 in conjunction with the storage module 263, the transmitter-receiver module 259, and the user interface module 265. Furthermore, in addition to executing instructions, the processor module 281 may include specific purpose hardware to accomplish some functions.

The terminal node 255 may communicate application related information with other devices. The terminal node 255 may receive application related information from other devices, transmit application related information to other devices, or both. For example, an application agent in an access node may cooperatively operate with the terminal node 255 to improve QoE for the user of the terminal node.

Figure 4:
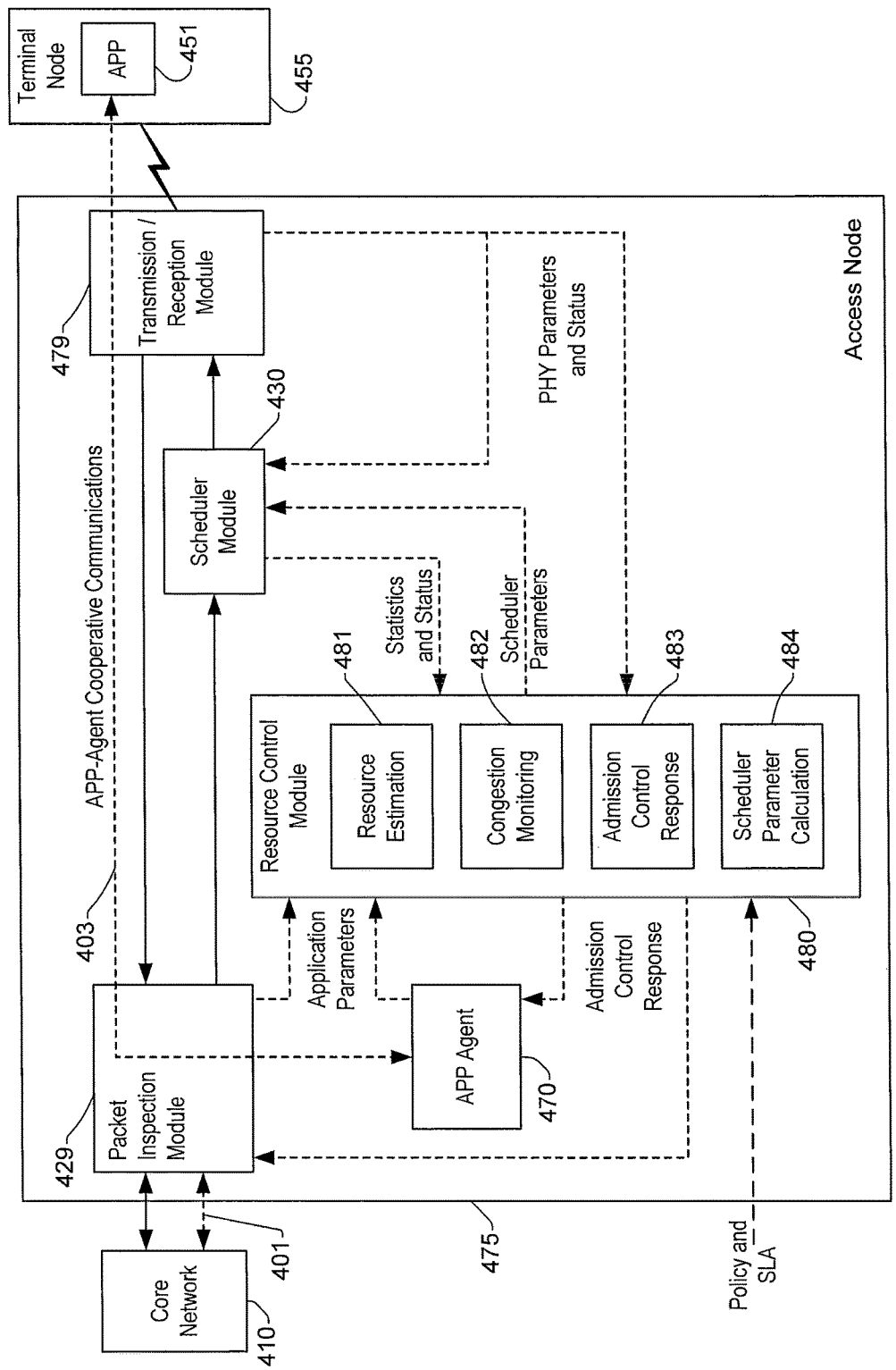
FIG. 4 is a diagram illustrating aspects of an access node in accordance with aspects of the invention.

FIG. 4 is a diagram illustrating aspects of an access node 475 in accordance with aspects of the invention. The access node 475 communicates with a terminal node 455 and a core network 410. The macro base station 110, the pico station 130, the enterprise femtocell 140, or the enterprise gateway 103 of FIG. 1, in some embodiments, are implemented using the access node 475. The access node 475 may be implemented, for example, using the access node 275 of FIG. 2. The core network 410 may also be a service provider network, the Internet, or a combination of networks. To aid in understanding, in FIG. 4, solid lines represent user data and dashed lines represent control data. The distinction between user data and control data is from the point of view of the access node 475. Since the access node 475 acts as a bridge, there may be control data from the terminal node 455 to some entity, such as a video server, in the core network 410 that is perceived by the access node 475 as user data.

The access node 475 of FIG. 4 facilitates communication between the terminal node 455 and entities in core network 410 and beyond (for example, entities accessed via the Internet such as video servers). An application 451 in the terminal node 455 communicates with a server application in, or connected to, the core network 410 via the access node 475. The application 451 provides some functionality or service for a user of the terminal node 455. For example, the application 451 may be a software program executed by the terminal node 455. The application 451 in the terminal node 455 also communicates with an application agent 470 in the access node 475. The application 451 may be a module provided, for example, by the processor module 261 of the terminal node 255 of FIG. 3 using instructions from the storage module 263. The application agent 470 may be a module provided, for example, by the processor module 281 of the access node 275 of FIG. 2 using instructions from the storage module 283.

The application 451 and the application agent 470 communicate via an APP-agent cooperative communication control path 403. Communications between the application 451 and the application agent 470 may provide improved communication system performance, for example, improved QoE for the user of the terminal node 455. Applications that provide communications on the APP-agent cooperative communication control path 403 may be considered enhanced or cooperative applications.

Although FIG. 4 illustrates single instances of each element, in an embodiment, there may be multiple instances of various elements. For example, the access node may concurrently communicate with multiple terminal nodes, and each of the terminal nodes may have multiple applications that may concurrently cooperate with one or more application agents in one or more access nodes.

The access node 475 includes a packet inspection module 429, a scheduler module 430, and a transmission/reception module (transceiver) 479. The packet inspection module 429, the scheduler module 430, and the transmission/reception module 479 are used by the access node 475 in communicating with the terminal node 455. The transmission/reception module 479 provides communications with the terminal node 455. The transmission/reception module 479 may, for example, implement a radio access network physical layer. The access node 475 also includes a resource control module 480 that is responsible for various aspects of resource control. The application agent 470 may also communicate with the resource control module 480.

The packet inspection module 429 is in a data path between the core network 410 and the terminal node 455. In the downlink direction, the packet inspection module 429 receives data from the core network 410 and decides what to do with the data. For example, user data bound for the terminal node 455 may be segregated into queues at the scheduler module 430 for transmission to the terminal node 455 via the transmission/reception module 479. The segregation into queues may be based on various characteristics associated with the user data, such as logical link, IP source and destination addresses, or application class. In an embodiment, the packet inspection module 429 is part of or coupled to a data bridge/relay module. The packet inspection module 429 may also include a routing function performed before or after the data bridge/relay module.

Some data from the core network may be control data intended for control and configuration of the access node 475. This data may be directed to various control or management modules of the access node 475, for example, the resource control module 480.

The scheduler module 430 implements some or all of the functionality required to allocate physical resources across the communication link between the access node 475 and the terminal node 455. The scheduler module 430 is typically associated with or part of a medium access control (MAC) layer. For the downlink direction, the scheduler module 430 decides which data to transmit and at what point in time. The resources may be allocated, for example, as subcarriers and timeslots. The scheduler module 430 may also process uplink resource requests from the terminal node 455 and grant uplink bandwidth. The scheduler module 430 may use PHY information from the transmission/reception module 479, such as modulation and coding scheme, to determine the amount of resources to allocate to specific user data. The scheduler module 430 may also inform the resource control module 480 of congestion occurring on the communication link or statistics relating to congestion monitoring (for example, buffer occupancy and egress rates). In an embodiment, the scheduler module 430 may receive updates to scheduler parameters, such as changes to weights and credits, from the resource control module 480.

The packet inspection module 429 may also detect applications and provide application information, such as application class, specific application, data rates, and durations, to the resource control module 480. In an embodiment, the packet inspection module 429 may receive admission control response information and aid in implementing the admission control response, such as blocking packets for a particular connection or session.

The resource control module 480 shown in FIG. 4 includes a resource estimation module 481, a congestion monitoring module 482, an admission control response module 483, and a scheduler parameter calculation module 484. The resource estimation module 481 estimates the expected resource needs of currently active applications. The resource estimation module 481 may use application parameters, such as expected data rate, and PHY parameters, such as changes in modulation and coding for the terminal node 455, to estimate the expected resource needs. Any excess in resources can be available to new applications or available to increase the resources allocated to a currently active application.

The congestion monitoring module 482 monitors the current state of congestion. The current state of congestion may vary from the resource estimation performed by the resource estimation module 481. For example, when a short-term change in data rate occurs (for example, a peak in the data rate for a variable data rate streaming video), information from the scheduler module 430 may indicate current congestion (for example, an increase in buffer occupancy for an application or a decrease in buffer egress rate for an application) even though the long-term resource estimation does not indicate congestion. The congestion monitoring module 482 may also maintain historical congestion information that may be used in predicting congestion.

The admission control response module 483 may create control responses to admit, deny, delay, or modify logical links, connections, and/or streams thereby creating control responses for sessions. The admission control response module 483 may create the control responses using various information, for example, policies (e.g., priority of users or acceptable level of user QoE), service level agreement (SLA) information, application parameters (e.g., specific application or data rate), resource estimates, APP-agent cooperative communications, and congestion indicators.

The scheduler parameter calculation module 484 may calculate modifications to scheduler parameters, such as weights and credits. The scheduler parameter calculation module 484 may calculate the modifications using various information, for example, APP-agent cooperative communications, policies, SLA information, application parameters, resource estimates, congestion indicators, and control responses (e.g., admission control responses).

The transmission/reception module 479, in addition to facilitating uplink and downlink data transfer, may monitor or maintain physical layer (PHY) parameters and status, such as modulation, coding, and signal-to-noise ratio (SNR) associated with communication with the terminal node 455. Capabilities of the access node 475 to communicate with terminal nodes depend in part on the PHY parameters and status. Information about PHY parameters and status may be made available to the scheduler module 430 to make scheduling decisions and to the resource control module 480 to calculate scheduler parameter adjustments or to determine admission control responses. The transmission/reception module 479 may also facilitate or generate communication between radio access protocol modules in the access node 475 and the terminal node 455.

In the uplink direction, the packet inspection module 429 receives user data from the terminal node 455 via the transmission/reception module 479 and forwards the user data to the core network 410. The packet inspection module 429 also receives communications from the terminal node 455 destined for the application agent 470. The packet inspection module 429 can identify these communications and forwards them to the application agent 470.

The application agent 470 and the application 451 establish the APP-agent cooperative communication control path 403. The APP-agent cooperative communication control path 403 can be, for example, a TCP connection. The APP-agent cooperative communication control path 403 is used for exchanging APP-agent cooperative communications. Routing of data on the APP-agent cooperative communication control path 403 may be facilitated by the packet inspection module 429. Alternatively, the routing may be facilitated by a routing function that can be internal or external to the access node 475.

APP-agent cooperative communications from the application 451 to the application agent 470 can include, for example, information that allows the access node 475 to improve admission control and scheduling. The communications between the application agent 470 and the application 451 can, for example, provide additional information to the resource control module 480.

As an introductory example of APP-agent cooperative communications, consider a communication network where the application 451 provides YouTube streaming video to the user of the terminal node 455. The streaming video may be available in multiple formats with different associated data rates. Information about the formats may be communicated by a YouTube specific application to a YouTube aware application agent that may, in turn, provide the information about the formats to the resource control module. The resource control module can use the application information to generate an admission control response that indicates which formats, if any, fit with current estimates of available resources. The YouTube aware application agent may process the admission control response into APP-agent cooperative communications to the YouTube specific application specifying which formats are currently allowable. In various embodiments, the specific choice of format may be made by the application agent or by the application and communicated back to application agent. The application agent may inform the resource control module of the chosen format and associated data rate. The resource control module updates resource estimates and scheduler parameters to reflect the chosen format.

FIG. 4 illustrates a particular allocation of functions to various modules and a particular distribution of modules in various communication nodes. Many other arrangements may also be used. For example, all or parts of the packet inspection module 429, the application agent 470, and the resource control module 480 could be in a gateway node in the core network, for example, in a serving gateway (S-GW) or a packet gateway (P-GW) in an LTE network. Additionally, there may be intermediate devices between the access node 475 and the core network 410 and terminal node 455. Many combinations of applications and application agents and their related functions may also be used. For example, there may be one application agent that communicates with all applications, one application agent for each particular application (e.g., a YouTube application agent, a Pandora application agent, etc.), one application agent for each terminal node, or one application agent for each application (e.g., a YouTube application agent for a first terminal node and another YouTube application agent for a second terminal node). When there are multiple applications and application agents, there may be individual communications connections (e.g., TCP/IP connections) between each pair of application and application agent. Alternatively, communication between multiple applications and application agents may be aggregated and carried via a reduced number of connections. For example, a single TCP/IP connection may be used to communicate between multiple application agents and applications for a specific terminal node.

Figure 5:
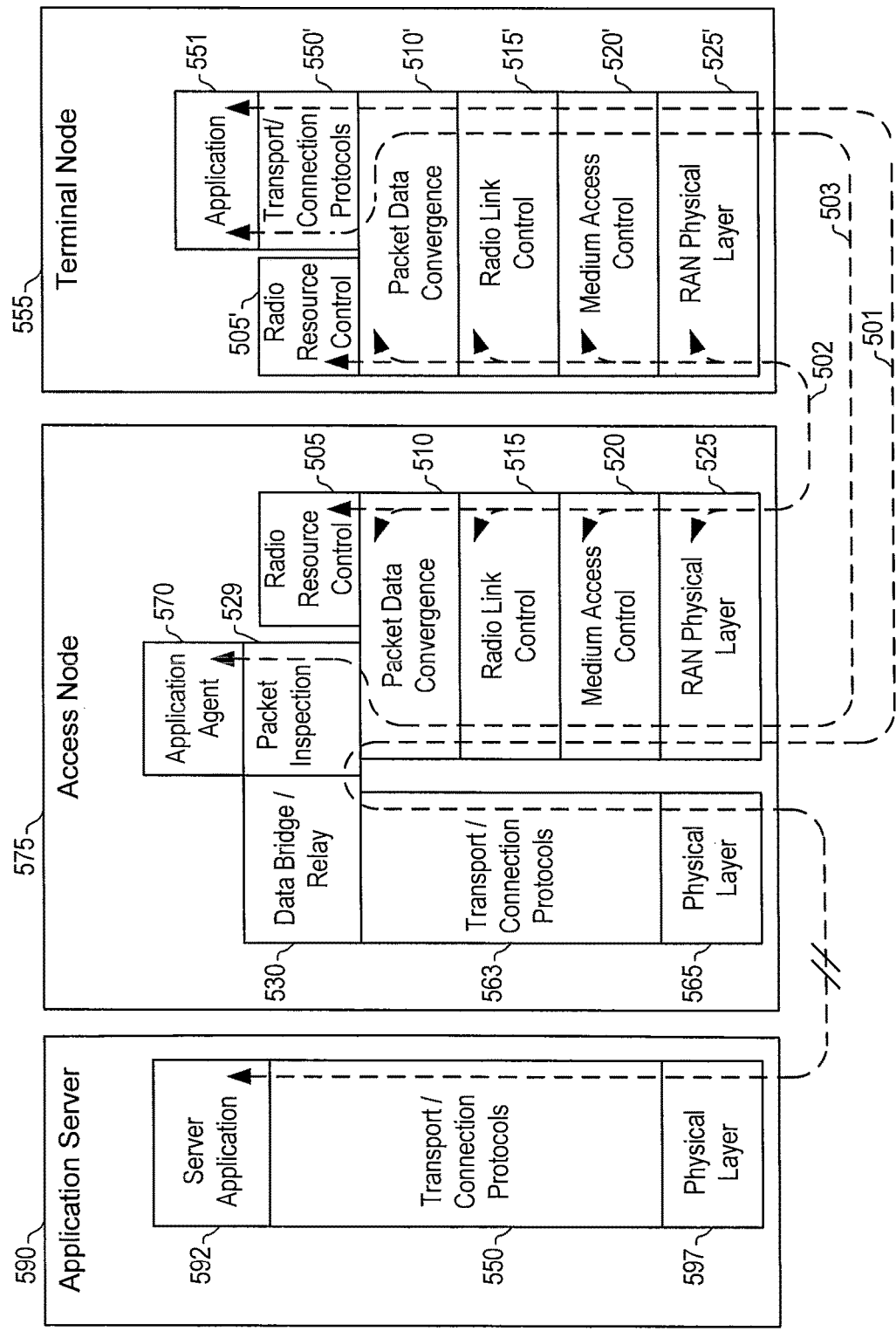
FIG. 5 is a block diagram of a communication system that shows control plane relationships in accordance with aspects of the invention.

FIG. 5 is a block diagram of a communication system that shows control plane relationships in accordance with aspects of the invention. The communication system includes a terminal node 555, an access node 575, and an application server 590. The terminal node 555 includes an application 551 that communicates with a server application 592 in the application server 590. The communication is via the access node 575. The application 551 also communicates with an application agent 570 in the access node 575.

The exemplary protocols, control plane relationships, and other descriptions of FIG. 5 may be used to further understand aspects related to the access node 475 of FIG. 4. The access node 475 of FIG. 4 may be similar to or the same as the access node 575 of FIG. 5. The terminal node 455 of FIG. 4 may be similar to or the same as the terminal node 555 of FIG. 5. Similarly, communications between the access node 575 and the application server 590 may utilize a network similar to or the same as the core network 410 of FIG. 4. Furthermore, the application server 590 of FIG. 5 may be in or connected to a network similar to or the same as the internet service provider network 101 or the core network 102 of the communication network of FIG. 1. The application server may also be a network of separately located servers. While the communication system of FIG. 4 uses LTE protocol stacks, other communication systems may use other protocol stacks. There could be more or fewer protocol layers, the layer names and terminology could be different, the functionality could be different, and in which layer a function resides could be different.

Devices in a communication network commonly communicate on communication paths through multi-layered protocols. Protocol stacks in the communicating devices implement the protocols. For example, an application data path 501 conveys communications between the terminal node 555 and the application server 590 via the access node 575 using protocol stacks in each device. In addition to the protocol stacks for passing user application data and control, there may be protocol stacks for implementing and managing the communications link in support of the user application.

The access node 575 of FIG. 5 includes a radio access network (RAN) control plane protocol stack to implement the RAN control plane protocol for control plane communications between the terminal node 555 and the access node 575. The RAN control plane protocol in the access node 575 may be implemented using, for example, the processor module 281 of the access node 275 of FIG. 2 using instructions from the storage module 283. The RAN control plane protocol stack in the access node 575 includes a RAN physical (PHY) layer module 525, a medium access control (MAC) layer module 520, a radio link control (RLC) layer module 515, a packet data convergence (PDCP) layer module 510, and a Radio Resource Control (RRC) layer module 505. Each of these protocol stack layers in the access node 575 has a peer layer in the terminal node 555. Thus, the RAN control plane protocol stack in the terminal node 555 includes a PHY layer module 525', a MAC layer module 520', a RLC layer module 515', a PDCP layer module 510', and a RRC layer module 505'.

In the control plane, RAN control information is typically exchanged between higher or lower layers in the same node, logically creating peer-to-peer control links between a layer on the access node 575 and the corresponding layer on the terminal node 555. A RAN control path 502 connects the peer layers of the access node 575 and the terminal node 555. Although FIG. 5 illustrates a single terminal node 555, a RAN control plane layer on the access node 575 may have logical control links to multiple peers on multiple terminal nodes.

The peer RAN control plane layer modules exchange control information necessary to control and operate the communication link between the two devices. This control information originates and terminates within the access node 575 and the terminal node 555 and is specific to operating and managing the communication link. In contrast, user application data and application control messaging originate and terminate on the terminal node 555 and the application server 590. From the point of view of the access node 575, user application data and application control messaging may be considered to be transported on the data plane rather than the control plane.

The RAN physical layer module 525 of the access node 575 has a control message peer relationship with the RAN physical layer module 525' of the terminal node 555. The RAN physical layer module 525 of the access node 575 may, for example, request transmit power changes of the RAN physical layer module 525' of the terminal node 555. The RAN physical layer module 525' of the terminal node 555 may send radio link quality metrics, such as signal-to-noise ratio (SNR) measurements, to the RAN physical layer module 525 on the access node 575. The MAC layer module 520 of the access node 575 has a control message peer relationship with the MAC layer module 520' of the terminal node 555. The MAC layer modules may, for example, exchange resource requests and grants. The RLC layer module 515 of the access node 575 has a control message peer relationship with the RLC layer module 515' of the terminal node 555. The RLC layer module may, for example, exchange data segmentation and reassembly information. The PDCP layer module 510 of the access node 575 has a control message peer relationship with a PDCP layer module 510' of the terminal node 555. The PDCP layer modules may, for example, exchange encryption and compression information. The RRC layer module 505 of the access node 575 has a control message peer relationship with a RRC layer module 505' of the access node 575. The RRC layer modules may, for example, exchange quality of service (QoS) parameters of logical links.

For communication between the application 551 and the server application 592, a transport and connection protocols module 550' on the terminal node 555 and a peer transport and connection protocols module 550 on the application server 590 are used to establish the application data path 501. The application data path 501 transports application control data and application user data. In various embodiments, the application data path 501 may use the same or different transport and connection protocols for application control data and application user data. Additionally, the same or different instances (e.g., software processes) of the protocol stacks may be used for application control data and application user data.

The application data path 501 may be viewed as communicating user data by the RAN protocol stack. Unlike data on the RAN control path 502, data from the terminal node 555 on the application data path 501 does not terminate in the access node 575. Instead, data on the application data path 501 is bridged by a data bridge/relay module 530 to a communication link for eventual transport to the application server 590. When an application does not provide APP-agent cooperative communications, all application traffic can be bridged to the next node. For such an application, application control may be limited to communication between the application and an associated server application.

Transport to the application server 590 may involve multiple links from the access node 575, for example, through gateway node or router node. The access node 575 may use a further transport and connection protocols module 563 to communicate with a first upstream communication node via further physical layer module 565. The transport and connection protocols module 563 may, for example, use the evolved general packet radio service (GPRS) tunneling protocol (eGTP). The physical layer module 565 may, for example, transmit data on a microwave backhaul or a carrier Ethernet link. At the application server 590, the data is received via a physical layer module 597 and handed to the transport and connection protocols module 550. Accordingly, the transport and connection protocols module 550 in the application server 590 may provide protocols that are peers to the protocols used in the transport and connection protocols module 563 in the access node 575 and provide protocols for communication with other communication nodes between the application server 590 and the access node 575 in addition to the protocols for communication with the terminal node 555.

Data on application data path 501, data on the RAN control path 502, and data on APP-agent cooperative communication control path 503 is transported between the terminal node 555 and the access node 575 via the RAN protocol stacks. However, the packet inspection module 529 in the access node 575 can divert the APP-agent cooperative communications to the application agent 570. Creating and communicating messages on the APP-agent cooperative communication control path 503 may utilize additional protocols in the access node 575 that are peered to the protocols used in the transport and connection protocols module 550' in the terminal node 555. The additional protocols may be provided, for example, by the packet inspection module 529 or the application agent 570.

Networks use layers of protocols to abstract the functions of one layer from those provided by another layer. Abstraction of layers can allow greater portability of applications to different networks. Initiation and subsequent termination of flows of packets in a network may be triggered by particular applications or services. A flow of control and user data packets relating to the use of an end-user application or service is termed a session. Examples of sessions include a voice over internet protocol (VoIP) call using the Skype application from a laptop, streaming video playback using a YouTube app running on an Android-based mobile phone, and a 2-way video call using the Apple iChat application.

Network nodes, such as application servers or proxy servers, and terminal nodes, such as smart phones, tablets, or laptop computers, may initiate or participate in a session. Nodes may host one or more sessions simultaneously. The sessions may be independent from one another (e.g., a user using Facebook and email simultaneously) or related to each other (e.g., a browsing session that spawns two video streaming sessions). A session may be established between two nodes. Alternatively, a session may be viewed as a relationship between one node and many nodes through the use of, for example, multicast and broadcast packet protocols.

Sessions may be characterized or categorized by various criteria. A specific application refers to the particular application that was initiated by the user and responsible for launching the session. Examples of specific applications include a YouTube app, the Chrome internet browser, and Skype voice calling software. More generally, an application class can be used to describe an overall function served by a particular session. Example application classes include streaming video, voice calling, Internet browsing, email, and gaming.

A session may consist of one or more independent data streams using the same or potentially different underlying connections. For example, a single VoIP phone call session may contain two data streams. One data stream may serve the bidirectional voice traffic (i.e., payload or data plane packets) using a user datagram protocol (UDP) connection. A second data stream may use one or more transmission control protocol (TCP) connections for control data to handle call setup/teardown (i.e., signaling or control plane packets) as, for example, when using the session initiation protocol (SIP). In the example of video Skype, there may be one stream to carry SIP signaling, to start, stop, and otherwise control the session, a second stream to carry voice packets using the Real-Time Transport protocol (RTP), and a third stream to carry video packets using RTP.

When an application is initiated by a user on a terminal node, the application may start with control signaling between the application and an associated application server. For example, when a YouTube app is started, it requests information on available video feed selections from a YouTube feed server with multiple simultaneous hypertext transfer protocol (HTTP) requests. The YouTube feed server replies with data about the feeds in a compressed format in HTTP responses. Each HTTP request/response is performed on separate TCP connections which are setup via a TCP establishment (e.g., SYN, SYN-ACK, and ACK messages) protocol between the TCP stack on the terminal nodes and a TCP stack on the YouTube server. Once the video feed data are received, the YouTube app may ask for thumbnail images from a YouTube image server for the videos listed in the feed data using multiple simultaneous HTTP GET requests. The YouTube image server provides the requested thumbnail images in HTTP responses. Each thumbnail request/response is carried on its own separate TCP connection.

For each video in the video feeds and search results, multiple uniform resource locators (URL) for different formats of the video are provided. The YouTube app decides which format to use based on its capabilities and user configurations and preferences. The YouTube app sends an HTTP GET request to the server with the URL of the video in the selected format. The YouTube server sends back the requested video in an HTTP response. The HTTP response is segmented into many IP packets. The first IP packet of the HTTP response carries the HTTP response status code (200=OK). An example of HTTP response headers is shown below.

HTTP/1.1 200 OK
Last-Modified: Sat, 11 Feb 2012 08:29:46 GMT
Content-Type: video/mp4
Date: Tue, 28 Feb 2012 00:31:10 GMT
Expires: Wed, 29 Feb 2012 00:31:10 GMT
Cache-Control: public, max-age=86400
Accept-Ranges: bytes
Content-Length: 56924607
X-User-Agent-Options: no-save
Connection: close
X-Content-Type-Options: nosniff
Server: gvs 1.0

In the example above, the HTTP response header "Content-Type" indicates that MP4 format video is included in the response. The HTTP response header "Content-Length" indicates that the length of the MP4 video included in the HTTP response is about 57 MB.

Figure 6:
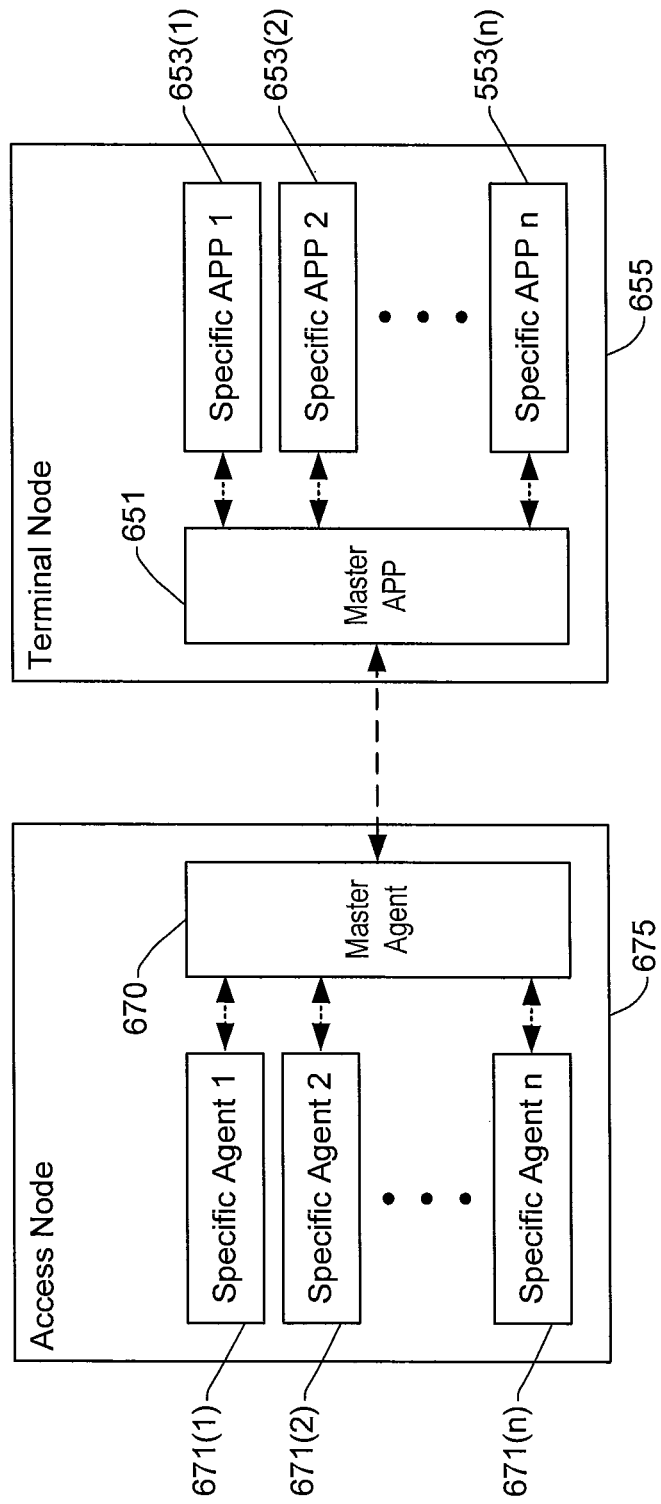
FIG. 6 is a block diagram of application agents and applications in accordance with aspects of the invention.

FIG. 6 is a block diagram of application agents and applications in accordance with aspects of the invention. The application agents are associated with an access node 675; the applications are associated with a terminal node 655. Applications in the terminal node 655 cooperatively operate with application agents in the access node 675. The application agents and applications may be used, for example, in the communication system of FIG. 4. The access node 675 of FIG. 6 may in various embodiments be similar to or the same as the access node 475 of FIG. 4; the terminal node 655 of FIG. 6 may in various embodiments be similar to or the same as the terminal node 455 of FIG. 4.

The access node 675 includes a master application agent 670. The master application agent 670 communicates with a master application 651 in the terminal node 655. In an embodiment, the master application 651 is part of an operating system of the terminal node 455. The master application agent 670 and the master application 651 facilitate communications between specific application agents 671(1)-671(n) in the access node 675 and specific applications 653(1)-653(n) in the terminal node 655.

The master application agent 670 and the master application 651 may facilitate communications between all the specific application agents 671 and the specific applications using a single TCP connection. An IP connection, in an embodiment, is established between the master application 651 and the master application agent 670.

The master application 651 and the master application agent 670 can be aware of the IP address of its peer, which may or may not be the same as the IP address of the associated access or terminal node, by various techniques. For instance, the access node may establish or discover a terminal node's IP address when the terminal node enters the network. In many embodiments, there are multiple concurrently operating terminal nodes and the master application agent 670 accordingly is aware of multiple peer node addresses. Address resolution protocol (ARP) may be used when a suitable, underlying Layer 2 address is available (e.g., an Ethernet MAC address) on which the ARP function may be based. Alternatively, the master application agent 670 may assign addresses to the master application 651 using a dynamic assignment technique, for example, dynamic host configuration protocol (DHCP). Alternatively, the IP connection information may be programmed into the master application 651 and the master application agent 670, for example, by an operator via a management connection. In another alternative, the access node 675 advertises the IP address of the master application agent 670. The IP address may be advertised as an augmentation of a control channel already in place for controlling the RAN (e.g., use a RAN control path). For example, the access node 675 may include the address in a network entry response to terminal nodes when they join the network or broadcast the address on a broadcast control channel (e.g., an LTE System Information Block (SIB) channel).

The IP address may not need to be routable outside the network defined by an access node and associated terminal nodes. Thus, various well-known, non-routable IP addresses may be used. The assignment of non-routable IP addresses in an LTE network may be based on an eNodeB physical cell identity (PCI). For example, the IP address of a master application agent in an eNodeB may be assigned a base address of 172.16.0.0 plus a 9-bit offset (of the 9 least-significant bits) corresponding to its 9-bit PCI value. The master application agent in an eNodeB with a PCI value of 255 would be assigned IP address of 172.16.0.255. As the eNodeB PCI is broadcast to all UEs within the eNodeB's serving range, the master application agent IP address would be calculable by a UE without RAN signaling overhead. This technique could also be applied to IPv6 addressing.

Similarly, the IP address of a master application in an LTE user equipment may also be a non-routable address. The non-routable address may be formed from a combination of a base address (using IPv4 or IPv6) plus an offset. The offset may be based, for example, on a default radio bearer identifier or Temporary Mobile Subscribe Identity (M-TMSI). As the addressing scheme can be known by the master application agent, the IP address of the master application can be known without RAN signaling overhead.

In an embodiment, communication between the master application 651 and the master application agent 670 is over a control communication channel specific to the radio access technology (RAT). The communications may use, for example, individual or broadcast messages. To facilitate new specific applications, RAT specific messages that provide a container for application specific messages may be used.

The master application agent 670 and the master application 651 may also process APP-agent cooperative communications. For example, the master application agent 670 or the master application 651 may coordinate, combine, or otherwise manipulate information communicated between the specific application agents 671 and the specific applications 653.

Information or requests that may be common to multiple different applications may be aggregated. For example, the master application agent 670 can provide the master application 651 with current congestion and excess resource headroom. The master application 651 can then supply congestion and resource headroom information to the specific applications 653.

Additionally, common queries, for example, whether a particular application class (e.g., voice, video) at a particular data rate can be supported with a desired level of QoS, may be uniformly implemented in a single master application-master application agent pair rather than in each specific application and specific application agent. Admission control responses, such as those which terminate or modify a service, may additionally be implemented in the master application 651 and the master application agent 670.

In addition to supporting common application-generated cooperative communications, the master application 651 and the master application agent 670 may pass through any additional APP-agent cooperative communication. That is, cooperative communications specific to a particular pair of the specific applications 653 and specific application agents 671 can pass through the master application 651 and the master application agent 670. For example, cooperative communications about a video client playback buffer status may pass from one of the specific applications 653 through the master application 651 and the master application agent 670 to one of the specific application agents 671.

Use of a master application agent or master application can reduce signaling overhead and reduce burdens on application developers. This can also reduce the complexity of interfacing the application agent(s) 671 with other functions in the access node 675, such as a resource control module.

Many variations on the application agents and applications shown in FIG. 6 are possible. For example, a master application may directly communication with specific application agents in an access node that does not include a master application agent. Existence or absence of a master application agent in an access node may be signaled by a presence bit or field in an already existing broadcast control channel, for example, in an LTE System information Block (SIB) channel. Similarly, a master application agent may directly communication with specific applications in a terminal node that does not include a master application. Additionally, an access node may have a master application agent as well as one or more application agents that directly communicate with applications, and a terminal node may have a master application as well as one or more applications that directly communicate with application agents. Furthermore, the above addressing schemes (or variants thereof) can also be used in the absence of a master application agent or master application.

APP-agent cooperative communications can be used in many ways. The following paragraphs describe examples of APP-agent cooperative communications. Many examples are described for specific applications and specific network technologies, but it should be understood that the examples and variations thereof are widely applicable to other applications and other network technologies. Similarly, many of the examples are described for APP-agent cooperative communications between an application agent in an access node and an application in a terminal node but it should be understood that the examples and variations thereof are widely applicable to other devices.

APP-agent cooperative communications may be used to adapt video communications for changing communications network conditions, for example, RAN conditions. In real-time video streaming protocols, for example, an application agent can inform the associated real-time streaming video application when the communication system has more or fewer resources available. The application agent may, for example, inform the application about the network conditions by communicating resource availability or by communicating new preferred or maximum data rates or resolutions for the video. When requesting the next block of video, the application can request a different resolution in order to adapt the video to the change in resources.

APP-agent cooperative communications may be used to adjust scheduling of communications from an access node. A device that uses application-aware scheduling can obtain information about the application from the APP-agent cooperative communications. The information about the application obtained via APP-agent cooperative communications might otherwise be difficult or impossible to obtain. The APP-agent cooperative communications may reduce or eliminate the use of application and application information detection for cooperative applications. The cooperation may also provide more accurate information about the state of an application. For a video session, for example, the APP-agent cooperative communications can communicate whether a video is in an initial buffering state, a playback/viewing state, a paused state, a stopped state, a rewind state, or a fast forward state. The access node can use the video state in scheduling decisions. The APP-agent cooperative communications can communicate playback buffer status and freeze indications from the video client application. Scheduler parameters in the access node can be adjusted accordingly.

APP-agent cooperative communications may be used in admission control decisions. The APP-agent cooperative communications can be used to create a more accurate picture of resource demand for application-aware admission control systems. For example, a cooperative application on a terminal node such as a streaming video client may report the average bitrate and duration of a streaming video session using APP-agent cooperative communication. Such information may be used by an access node in calculating current and future resource demand. By subtracting resource demand from the access node capacity, a measure of the available excess capacity is created which may be applied to new services requesting admission.

The APP-agent cooperative communications can be used to provide increased options for admitting a modified version of a session or provide increased options for modifying other sessions to allow a new session. For example, a cooperative application on a terminal node may communicate a set of bitrate options available for a video clip by using APP-agent cooperative communication (e.g., a list of rendering bitrates transmitted by a "Dynamic Adaptive Streaming over HTTP" or DASH server to a DASH application during session initialization). Based upon the available excess capacity, the access node may eliminate or forbid the use of one or more of the higher bitrate options in the list. The reduced list may be communicated back to the terminal node providing the application with a reduced set of bitrate options. This allows for reliable video playback within the constraints of the access node's available capacity. Additionally or alternatively, in networks with multiple terminal nodes, support of a new video session, such as the DASH session above, may include sending an updated bitrate list to one or more video sessions already in progress. For example, in order to support a new tenth DASH video session (the tenth session to be added with nine ongoing sessions), an access node may reduce the maximum bitrate available to the tenth session as well as send updated bitrate lists (with lower maximum bitrate options) to one or more of the ongoing nine sessions in order to free sufficient capacity to support the tenth session. During times of increasing excess capacity, the methods above may be reversed (i.e., expanding the bitrate list by increasing the maximum allowable bitrate) in order to improve user QoE. Additionally, in systems, such as LTE, where admission control is specified on a coarse, logical bearer basis rather than on a per session basis, APP-agent cooperative communications can be used to create finer grained admission control that responds with denials and modifications on a per session basis.

APP-agent cooperative communications may be used during handover. Information from the APP-agent cooperative communications can be used to optimize user quality of experience (QoE) during handover. For example, data buffered in an application may be increased prior to handover to avoid the buffer emptying during handover. When a handover is expected for a terminal node running a cooperative video application and the access node is aware, through APP-agent cooperative communication, that the video client playback buffer has additional capacity, scheduler parameters in the access node may be adjusted to increase the amount of video data buffered in the terminal node just prior to handover. Handover timing may also be controlled so that handover occurs during a convenient time for the application, that is, during a time that any interruption or delay in communication has less impact on QoE. For example, if handover is expected but not immediately necessary, handover may be initiated immediately when the application indicates to the application agent that the video has been paused. Similarly, an application agent may instruct applications communicating delay tolerant information, such as an email application or a browser application, to defer send or receive requests until after handover is complete. Handover improvement through APP-agent cooperative communications may improve efficiency for both the application and the communication network versus retransmitting data lost or damaged during handover.

APP-agent cooperative communications may be used to assess video quality. For example, the APP-agent cooperative communications can communicate information from RTP control protocol (RTCP) reports. RTCP reports contain information that allows assessing video quality. While an access node may be able to detect and extract information from RTCP reports (for example, using a packet inspection module), the same or similar information can be passed from an application to an application agent, reducing the computational resources needed in the access node. Availability of video quality information may be used to adjust scheduler parameters and resource allocations. For example, the access node may increase scheduler priorities for a video application to improve the quality if it is insufficient or may reallocate resource to other applications if the quality is above a threshold.

APP-agent cooperative communications may be used in scheduling acknowledgments. Information from the APP-agent cooperative communications may be used, for example, in scheduling TCP Acknowledgment (ACK) messages. Improved scheduling of TCP ACK messages on the uplink can avoid or rectify situations that may cause a stall or downlink data starvation for an application using TCP as one of its transport and connection protocols. The access node may use information about the timing of TCP ACK messages when the access node allocates uplink bandwidth to the terminal node. More precise timing of uplink bandwidth allocation for TCP ACK messages may be possible if a cooperative application provides information regarding the expected occurrences of TCP ACK messages. Communication bandwidth used for bandwidth allocation may also be reduced.

Additionally, robustness of modulation and coding schemes may be increased when TCP ACK messages are expected. Alternatively, a cooperative application may send a TCP ACK message after a timeout even though data was not received in order to prevent a stall or freeze. The timeout occurrences can be reported to the application agent, for example, for use in adjusting scheduler parameters to improve future performance. The application agent may report congestion conditions to the application allowing it to change its timeout threshold for sending a TCP ACK message after a timeout even though data was not received. Changing the threshold can occur, for instance, when the next segment of video can be requested at a lower rate to avoid future congestion, but the likelihood of freezes is high for the remainder of the current video segment.

APP-agent cooperative communications may be used in service differentiation. Information from the APP-agent cooperative communications may be used, for example, to distinguish service scenarios that may otherwise be difficult or impossible to detect. A cooperative email application may, for example, indicate to the corresponding application agent what event triggered an email synchronization. When the email synchronization is triggered by a timeout or some other machine-generated stimulus, the access node may give a relatively low priority to scheduling the downlink data and corresponding uplink protocol, and when the email synchronization is triggered by a user action, the access node may give a relatively high priority to scheduling the downlink data and corresponding uplink protocol. Thus, a higher priority is used when the user is waiting and a lower priority is used when no user is waiting. Accordingly, the APP-agent cooperative communications from a terminal node to an access node may include information about the stimulus of a communications request, for example, whether a user is waiting for requested data.

Similarly, an application may distinguish whether a user is specifically requesting to view a video (e.g., the user clicked on a video link) from a video coincidentally embedded in a webpage (e.g., the user chose a link to a news article that happens to have an embedded video). When the user chooses a video specifically, the QoE of the video is more important and a scheduler can adjust scheduler parameters accordingly based on information from APP-agent cooperative communications. In contrast, when the video is secondary, the scheduler can give more priority to the text of the story. Similar consideration may be used, for example, during severe congestion, to admission control decisions.

Furthermore, an application that combines multiple media in a session can signal the relative importance of the media to the application agent. A video calling application, for example, may deem the voice portion of the session to be more important than the video portion. If there are insufficient resources for both the voice portion and the video portion, the access node can use information about the relative importance received in APP-agent cooperative communications to preserve quality of the audio portion while the video portion is degraded or denied.

APP-agent cooperative communications may be used to avoid reduced QoE caused by traffic grooming. Traffic rates to and from a terminal node may be limited in multiple ways. When traffic rate limits are exceeded, traffic grooming may be triggered with some packets dropped or delayed. The traffic grooming may occur in a communication node that is not aware of the needs of the terminal node's applications. Such a communication node would thus delay or drop packets without regard to the effects on QoE. The APP-agent cooperative communications can be used by applications to avoid requesting excessive data that could trigger grooming. By not triggering grooming, the QoE may be improved. Other capabilities for communication can be similarly signaled to a terminal node, and the terminal node can adjust its requests accordingly.

An example rate limit is the aggregate maximum bit rate (AMBR) that an LTE system applies to a terminal node (user equipment in LTE nomenclature). The AMBR governs bandwidth resources that may be allocated to the terminal nodes, even if excess system resources exist. The LTE packet gateway is often provisioned to groom the data going to the terminal node, delaying or discarding packets, to ensure the average data rate is no more than the AMBR.

Traffic rates for a terminal node may also be limited contractually by a service level agreement (SLA). SLA limits may apply at various levels, for example, the terminal node, a logical link, a bearer, or a connection.

The terminal node may have limited or no knowledge of its rate limits. For example, the terminal may know its AMBR but not the SLA limits. Individual applications generally do not know the rate limits. Furthermore, the individual application would not know which other applications are active or the resource demands of the other applications relative to the rate limits. For example, a video application may not know whether a particular video resolution will cause a rate limit to be exceeded, and thus trigger delays and discards of packets for all the applications on the terminal node.

In an embodiment, a master application or master application agent, for example, as shown in FIG. 6, may keep track of cumulative application resource requests and track the cumulative resources versus rate limits. Other modules, for example, a part of the terminal node's operating system or a part of the RAN protocol stack (e.g., radio resource control (RRC) or radio resource management (RRM) for LTE), may keep track of cumulative application resource requests for use by applications. A cooperative application may communicate with the master application, the master application agent, or another module to determine the remaining data rate available and use the rate information in guiding its requests for data. In various embodiments, the cumulative resource requests may be tracked in the access node or the terminal node. The mechanism by which applications determine the resource allocation and rate limit information varies according to where the information is available. For example, an application may communicate with an application agent that communicates with module in the RAN protocol stack that keeps track of resource utilization and rate limits for the terminal node and its collection of active applications.

APP-agent cooperative communications may be used for analyzing the performance of a communications network. Information related to performance can be collected from APP-agent cooperative communications. For example, when an application communicates information about video stalls, audio stalls, or buffer under-runs, the information can be used to analyze the performance of the terminal node, the access node, and other area of the communication system. The application may additionally communicate the number and duration of playback stalls or a chronology of playback, start and stop times of each video or audio session. The application may communicate an estimate of video or audio playback quality, for example, in the form of a mean opinion score (MOS). Additionally, the application may communicate packet-level quality of service (QoS) metrics, for example, packet delay and jitter, measured at the terminal node. The application may also report user-level (human) actions that may signal severe dissatisfaction with network performance, for example, one or more browser or application refreshes, duplicate 'clicks' or 'touches' on the same link or command, or user shutdown of an application following a period of poor network quality or poor application responsiveness. The various information can be used to determine a level of congestion that is acceptable for different applications or different mixes of applications. The information can also be used by the operator to determine when to add more resources to a network.

It is clear from these examples that APP-agent cooperative communications can be used for many different types of information, used with many different types of applications, and used to improve many different aspect of a communication network.

FIG. 7 is a block diagram of a communication system with application agents and applications in accordance with aspects of the invention. A terminal node 755 hosts an application 751. The application 751 may communicate with an application server 790 to facilitate providing services to a user of the terminal node 755. Various elements of the communication system may the same or similar to like named elements described above.

The terminal node 755 in the communication system shown in FIG. 7 communicates with an access node 775 over a radio link 720. The access node 775 is connected to a gateway node 795. The gateway node 795 provides access to the Internet via connectivity to a router node 793. The router node 793 provides access to the application server 790. Thus, the application 751 can communicate with the application server 790 using an application data path 701 through the access node 775, the gateway node 795, and the router node 793. The application data path 701 transports application user data (e.g., video data) and application control data (e.g., information regarding possible videos available and their formats). The access node 775 acts as a bridge for communications on the application data path 701, passing it between the terminal node 755 the next node in the communication system.

The application 751 also communicates with an application agent 770 in the access node 775 using an APP-agent cooperative communication control path 703. The APP-agent cooperative communication control path 703 is transmitted over the radio link 720. Communications on the APP-agent cooperative communication control path 703 between the application 751 and the application agent 770 may be used, for example, for improving scheduling, admission control, efficiency, and responsiveness.

FIG. 8 is a block diagram of another communication system with application agents and applications in accordance with aspects of the invention. The communication system of FIG. 8 is similar to the communication system of FIG. 7 and includes a terminal node 855, an access node 875, a gateway node 895, a router node 893, and an application server 890 that correspond to like-named devices in the communication system of FIG. 7. The terminal node 855 communicates with the access node 875 over a radio link 820. The access node 875 is connected to the gateway node 895. The gateway node 895 provides access to the Internet via connectivity to the router node 893. The router node 893 provides access to the application server 890.

An application 851 in the terminal node 855 can communicate with the application server 890 using application data path 801 through the access node 875, the gateway node 895, and the router node 893. The application 851 also communicates with an application agent 870 using an APP-agent cooperative communication control path 803. In the communication system of FIG. 8, the application agent 870 is in the gateway node 895. Information from the application agent 870 may be provided to the access node 875. The APP-agent cooperative information may be supplied, for example, to scheduler and resource control modules in the access node 875. The access node 875 can use the APP-agent cooperative information, for example, for improving scheduling, admission control, efficiency, and responsiveness.

In another embodiment, an application agent may be located in the router node 893 or in another network node. The functions of an application agent may also be distributed over multiple devices.

Additionally, if the APP-agent cooperative communication control path 803 is via an IP connection, the path may be through additional communication nodes. For example, cooperative communications may be routed through the router node 893. Locating the application agent outside the access node 875 may eliminate or reduce uplink packet inspection requirements in the access node 875. A remotely located application agent may also perform function for multiple access nodes.

Figure 9:
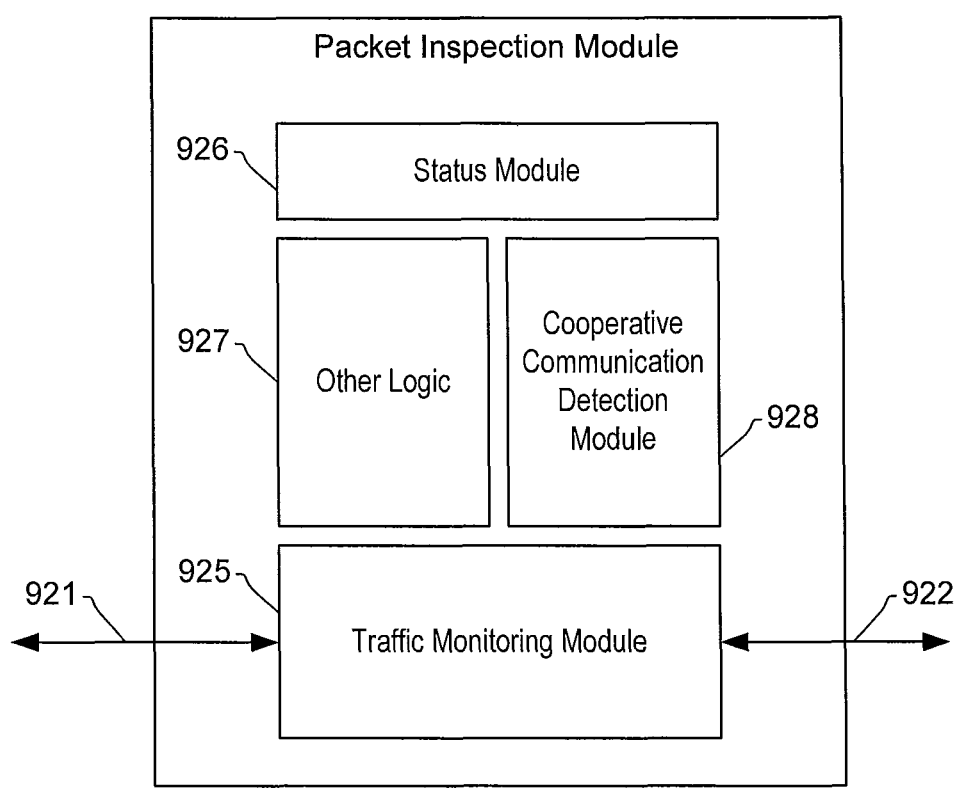
FIG. 9 is a block diagram of a packet inspection module in accordance with aspects of the invention.

FIG. 9 is a block diagram of a packet inspection module in accordance with aspects of the invention. The packet inspection module 429 of the access node 475 of FIG. 4 may be, may for example, be provided by the packet inspection module of FIG. 9. The packet inspection module may be used in a data path between a RAN protocol stack and other entities, such as application servers, residing in a core network or the Internet.

Uplink data may come to the packet inspection module from via a first path 921 (e.g., on a radio link) and be forwarded from the packet inspection module via a second path 922 (e.g., on a backhaul connection). Downlink data may come to the packet inspection module via the second path 922 and be forwarded from the packet inspection module via the first path 921.

The packet inspection module includes a traffic monitoring module 925 that may monitor traffic on the first path 921 and the second path 922. The traffic monitoring module 925 identifies APP-agent cooperative communications from an application destined for an application agent. In particular, the traffic monitoring module 925 may monitor the uplink traffic on the first path 921 to identify APP-agent cooperative communications. The APP-agent cooperative communications may be identified using, for example, IP addresses.

The traffic monitoring module 925 may also monitor traffic at the packet inspection module for other purposes, and the packet inspection module may include an other logic module 927 to address the other purposes. The packet inspection module may also detect information about applications associated with the traffic on the first and second paths. Further examples of packet inspection, traffic monitoring, and application-aware communication systems may be found in of U.S. patent application Ser. No. 13/549,106, filed Jul. 13, 2012 and titled "Systems and Methods for Detection for Prioritizing and Scheduling Packets in a Communication Network," U.S. provisional application Ser. No. 61/640,984, filed May 1, 2012 and titled "Application Aware Admission Control," and U.S. provisional application Ser. No. 61/579,324, filed Dec. 22, 2011 and titled "Congestion Induced Video Scaling," which are hereby incorporated by reference.

APP-agent cooperative communication traffic is diverted to a cooperative communication detection module 928. The cooperative communication detection module 928 provides further processing on the APP-agent cooperative communication traffic. An example of the further processing is forwarding the traffic to an appropriate application agent. The further processing may also include no processing, for example, when the cooperative communication detection module 928 determines that the traffic forwarded to it is not for an application agent associated with the packet inspection module.

The packet inspection module, as illustrated in FIG. 9, may include a status module 926. The status module 926 may keep track of information regarding instances of connectivity between applications and application agents. The information may include, for example, status (e.g., connected, disconnected, active, idle), current resource expectations, and historical data (e.g., resources requested versus resources used).

The foregoing systems and methods and associated devices and modules are susceptible to many variations. Additionally, for clarity and concision, many descriptions of the systems and methods have been simplified. For example, the figures generally illustrate one of each type of device (e.g., one access node, one terminal node), but a communication system may have many of each type of device. Similarly, many descriptions use terminology and structures of a specific wireless standard such as LTE. However, the disclosed systems and methods are more broadly applicable, including for example, in hybrid fiber-coax cable modem systems.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A macro cell base station of a radio access network (RAN), comprising:
   a transceiver configured to communicate with a first terminal node that is hosting a first user application;
   a backhaul transceiver configured to provide communications with an application server; and
   a processor coupled to the transceiver and the backhaul transceiver and comprises a hardware processor configured at least to implement:
      an application agent module that is associated with the first user application and that is configured to receive state information which comprises a multimedia streaming status about the first user application from the first terminal node via an established first application-agent cooperative communication control path between the application agent module and the first user application, wherein the first application-agent cooperative communication control path is between the macro cell base station and the first terminal node without including a backhaul link, the multimedia streaming status is associated with an expected multimedia streaming data rate required by the first user application, and the expected multimedia streaming data rate is user action dependent;
      a scheduler parameter calculation module configured to modify at least one scheduler parameter in response to a change of the received state information about the first user application; and
      a scheduler module configured to receive downlink packets via the backhaul transceiver, group the downlink packets into queues, and schedule the downlink packets for transmission by the transceiver utilizing the modified at least one scheduler parameter,
   wherein based on the received state information about the first user application, the application agent module determines capabilities of the macro cell base station, determines a set of bitrate options according to the capabilities of the macro cell base station, transmits the set of bitrate options, receives a selection of one bitrate option from the set of bitrate options, and transmit the downlink packets according to the selection of the one bitrate option,
   wherein some of the downlink packets are received by the scheduler module from the application server in response to a request from the first terminal node, and wherein the state information about the first user application includes stimulus information which indicates whether a user is waiting and is about a stimulus for the request, and
   wherein a priority level of the scheduler parameter associated with the downlink packets received from the application server in response to the request from the first terminal node is based at least in part on the stimulus information.

2. The macro cell base station of claim 1, wherein the stimulus information affects the priority level of the scheduler parameter associated with the downlink packets received from the application server in response to the request from the first terminal node as the priority level is increased when the user is waiting.

3. The macro cell base station of claim 1, wherein the scheduler parameter are set to increase priority of communications to the first terminal node prior to handover of the first terminal node to another macro cell base station, and the application agent module optimizes quality of experience (QoE) by increasing an amount of data buffer associated with the first user application.

4. The macro cell base station of claim 1, wherein the processor is further configured to implement an admission control response module configured to receive an admission request from the first terminal node and determine an admission control response utilizing the state information about the first user application.

5. The macro cell base station of claim 4, wherein the admission request includes an indication of multiple formats that is used in a session associated with the admission request, and wherein the admission control response includes indications of which of the formats, if any, are within the bounds of current estimates of available resources for communications with the first terminal node.

6. The macro cell base station of claim 1, wherein:
   the transceiver is further configured to communicate with a second terminal node that is hosting a second user application; and
   the applicant agent module implemented by the processor is further configured to establish a second application-agent cooperative communication control path between the application module and the second user application without including the backhaul link, and the application agent module comprises:
      a master application agent module that is associated with the first user application and the second user application and is configured to receive the state information about the first user application and the second user application and to process a first portion of the state information that is common to both the first user application and the second user application, aggregates capacity information used by both the first user application and the second user application, and transmits the capacity information to the first terminal node and the second terminal node, and at least one specific application agent module that is coupled to the master application agent module and is configured to receive at least some of the state information about one or more of the first user application and the second user application.

7. The macro cell base station of claim 6, wherein the first application-agent cooperative communication control path is an Internet protocol (IP) connection, and wherein the master application agent module has an associated IP address.

8. The macro cell base station of claim 7, wherein each of the at least one specific application agent module has an associated IP address.

9. The macro cell base station of claim 1, wherein the first application-agent cooperative communication control path uses a control communication channel specific to a radio access technology used for communications between the macro cell base station and the first terminal node.

10. The macro cell base station of claim 1, wherein the macro cell base station transmits to the first terminal node information about the capabilities of the macro cell base station for communication with the first terminal node.

11. The macro cell base station of claim 10, wherein the information about the capabilities of the macro cell base station for communication includes congestion information.

12. The macro cell base station of claim 1, wherein the state information about the first application includes information selected from the group consisting of information about occupancy of a video playback buffer in the terminal node, information about quality of a video transmitted to the first terminal node, information for analyzing performance of a communications network that includes the macro cell base station, and an estimate of audio quality.

13. The macro cell base station of claim 1, wherein the first user application is a video application, and wherein the state information about the first user application includes indications of video freezes.

14. The macro cell base station of claim 1, wherein the state information about the first user application includes the multimedia streaming status selected from the group consisting of an initial buffering state, a playback stage, a paused state, a stopped state, a rewind state, and a fast forward state.

15. The macro cell base station of claim 1, wherein the transceiver is further configured to receive, from the first terminal node, a request for data from an application server, wherein the request for data from the application server is a request for multiple media, and wherein the state information about the first user application includes indications of relative priorities of the multiple media.

16. The macro cell base station of claim 1, wherein the first user application is a multimedia streaming application, and wherein the state information about the first user application includes information about timing of streaming events that includes numbers and durations of stalls.

17. The macro cell base station of claim 1, wherein the state information about the first user application includes information about actions by a user of the first terminal node that indicate dissatisfaction with communications performance.

18. The macro cell base station of claim 1, wherein the state information about the first user application includes a packet level quality of service metric measured by the first terminal node.

19. The macro cell base station of claim 1, wherein the transceiver transmits the scheduled downlink packets to the first terminal node along with characteristics that include timing of handover of the first terminal node to another macro cell base station.

20. The macro cell base station of claim 19, wherein the characteristics include characteristics that improve quality of experience for a user of the first terminal node.

21. The macro cell base station of claim 1, wherein the transceiver transmits the scheduled downlink packets to the first terminal node along with characteristics that are based at least in part on historical congestion information associated with past communications between the macro cell base station and the first terminal node.

22. The method of claim 1, wherein the application agent module determines a set of bitrate options according to the capabilities of the macro cell base station comprising:

determines the set of bitrate options by reducing the set of bitrate options in response to the capabilities of the macro cell base station being diminished, and determines the set of bitrate options by increasing the set of bitrate options in response to the capabilities of the macro cell base station being increased.

23. A method for operating a macro cell base station in a radio access network (RAN), the macro cell base station configured to provide communications between a first terminal node and an application server, the method comprising:

receiving, from the first terminal node, state information which comprises a multimedia streaming status about a first user application being hosted at the first terminal node, the state information being received by an application agent module in the macro cell base station via a first application-agent cooperative communication control path established between the application agent module and the first user application, wherein the first application-agent cooperative communication control path is between the macro cell base station and the first terminal node without including a backhaul link the multimedia streaming status is associated with an expected multimedia streaming data rate required by the first user application, and the expected multimedia streaming data rate is user action dependent;

modifying at least one scheduler parameter in response to a change of the received state information about the first user application;

receiving downlink packets from the application server via a backhaul transceiver, and grouping the downlink packets into queues; and scheduling the queues of downlink packets for transmission from the macro cell base station to the first terminal node based on the modified at least one scheduler parameter, wherein based on the received state information about the first user application, the application agent module determines capabilities of the macro cell base station, determines a set of bitrate options according to the capabilities of the macro cell base station, transmits the set of bitrate options, receives a selection of one bitrate option from the set of bitrate options, and transmit the downlink packet according to the selection of the one bitrate option,
wherein some of the downlink packets are received from the application server in response to a request from the first terminal node, and wherein the state information about the first user application includes stimulus information which indicates whether a user is waiting and is about a stimulus for the request, and
wherein a priority level of the scheduler parameter associated with the downlink packets received from the application server in response to the request from the first terminal node is based at least in part on the stimulus information.

24. The method of claim 23, further comprising transmitting to the first terminal node information about the capabilities of the macro cell base station for communication with the first terminal node.

25. The method of claim 24, wherein the information about capabilities of the macro cell base station for communication includes congestion information.

26. The method of claim 23, wherein the state information about the first user application includes information selected from the group consisting of information about occupancy of a video playback buffer in the terminal node, information about quality of a video transmitted to the temlinal node, information for analyzing performance of a communications network that includes the macro cell base station, and an estimate of audio quality.

27. The method of claim 23, wherein the first user application is a video application, and wherein the state information about the first user application includes indications of video freezes.

28. The method of claim 23, wherein the state information about the first user application includes a multimedia streaming status selected from the group consisting of an initial buffering state, a playback state, a paused state, a stopped state, a rewind state, and a fast forward state.

29. The method of claim 23, wherein the stimulus information affects priority of the at least one scheduler parameter used to schedule communications associated with the request as the priority level is increased when the user is waiting.

30. The method of claim 23, further comprising receiving, from the first terminal node, a request for data from the application server, wherein the request for data from the application server is for multiple media, and wherein the state information about the first user application includes indications of relative priorities of the multiple media.

31. The method of claim 23, wherein the first application is a multimedia streaming application, and wherein the state information about the first user application includes information about timing of streaming events that includes numbers and durations of stalls.

32. The method of claim 23, wherein the state information about the first user application includes information about actions by a user of the first terminal node that indicate dissatisfaction with communications performance.

33. The method of claim 23, wherein the state information about the first user application includes a packet-level quality of service metric measured by the first terminal node.

34. The method of claim 23, wherein the macro cell base station transmits the scheduled queues of downlink packets to the first terminal node, the downlink packets being transmitted along with characteristics that utilize the state information about the first user application.

35. The method of claim 23, wherein the at least one scheduler parameter is set to increase priority of communications to the first terminal node prior to handover of the first terminal node to another macro cell base station, and the application agent module optimizes quality of experience (QoE) by increasing an amount of data buffer associated with the first user application.

36. The method of claim 34, wherein the characteristics include timing of a handover of the first terminal node to another macro cell base station.

37. The method of claim 34, wherein the characteristics include characteristics that improve quality of experience for a user of the first terminal node.

38. The method of claim 23, further comprising determining an admission control response utilizing the state information about the first user application.

39. The method of claim 38, wherein the admission control response is determined in response to an admission request from the first terminal node, wherein the admission request includes an indication of multiple formats that is used in a session associated with the admission request, wherein the admission control response includes indications of which of the formats, if any, are within the bounds of current estimates of available resources for communications with the first terminal node.

40. The method of claim 23, further comprising maintaining historical congestion information associated with communications between the macro cell base station and the first terminal node, and wherein the scheduled queues of downlink packets are transmitted to the first terminal node along with further characteristics that are based at least in part on the historical congestion information.

41. The method of claim 23, wherein the application-agent cooperative communication control path is an Internet protocol (IP) connection, and wherein the application agent module and the first user application have associated IP addresses.

42. The method of claim 41, further comprising obtaining an IP address associated with the first user application via address resolution protocol.

43. The method of claim 41, wherein the IP addresses are assigned using dynamic host configuration protocol.

44. The method of claim 41, wherein an IP address associated with the macro cell base station includes a value based on a physical cell identity of the macro cell base station.

45. The method of claim 23, wherein the application-agent cooperative communication control path is over a control communication channel specific to a radio access technology used for communications between the macro cell base station and the first terminal node.

46. The method of claim 23, wherein the state information about the first user application is relayed from the first terminal node to the macro cell base station via a third device, and wherein the third device processes the state information before relaying the state information to the macro cell base station.

47. The method of claim 23, wherein the application agent module includes a master agent module and a plurality of specific application agent modules, and wherein one of the plurality of specific application agent modules receives the state information about the first user application via the master agent module and another of the plurality of specific application agent modules receives information about another application via the master agent module.

48. A terminal node, comprising:
a transceiver configured to communicate with a macro cell base station; and a processor coupled to the transceiver and comprises a hardware processor configured to
execute a first user application and obtain state information which comprises a multimedia streaming status about the first user application, wherein the multimedia streaming status is associated with an expected multimedia streaming data rate required by the first user application and is user action dependent,
transmit, via the transceiver, a request for communications from an application server,
transmit, via the transceiver, the state information about the first user application to the macro cell base station over a first application-agent cooperative communication control path established between the first user application and an application agent in the macro cell base station without including a backhaul link,
receive, from the macro cell base station, a set of bitrate options in response to transmitting the state information about the first user application,
determine, from the set of bitrate options, a selection of one bitrate option,
transmit, via the transceiver to the macro cell base station, the selection of the one bitrate option, and
receive, from the macro cell base station, data which is associated with the first user application and a dynamically changing quality of experience (QoE) based on at least the multimedia streaming status,
wherein the state information about the first user application includes stimulus information which indicates whether a user is waiting and is about a stimulus for the request.

49. The terminal node of claim 48, wherein the processor is further configured to receive, from the macro cell base station, information about capabilities of the macro cell base station for communication with the terminal node.

50. The terminal node of claim 49, wherein the information about capabilities of the macro cell base station for communication includes information selected from the group consisting of an amount of resources available at the macro cell base station, a preferred data rate for use by the terminal node, a maximum data rate usable by the terminal node, a maximum data rate usable by the first user application, and a traffic rate limit.

51. The terminal node of claim 49, wherein the information about capabilities of the macro cell base station for communication includes information about an upcoming handover.

52. The terminal node of claim 49, wherein the processor is further configured to send, to the macro cell base station, a new request for communications from an application server via the macro cell base station, the new request having characteristics that utilize the information about capabilities of the macro cell base station for communication, wherein the characteristics include characteristics selected from the group consisting of a video format, a bit rate, and timing of the request for further communications.

53. The terminal node of claim 52, wherein the information about capabilities of the macro cell base station for communication includes a maximum data rate usable by the terminal node, and wherein the characteristics further include a data rate that avoids exceeding the maximum data rate.

54. A method for operating a terminal node that is hosting a first user application, the method comprising:
obtaining state information which comprises a multimedia streaming status about the first user application, wherein the multimedia streaming status is associated with an expected multimedia streaming data rate required by the first user application and is user action dependent;
sending, via a macro cell base station, a request for communications from an application server;
sending, via a first application-agent cooperative communication control path established between the first user application and an application agent module in the macro cell base station, the state information about the first user application, wherein the first application-agent cooperative communication control path is between the macro cell base station and the terminal node without including a backhaul link;
receiving, via the first application-agent cooperative communication control path, a set of bitrate options in response to transmitting the state information about the first user application,
determining, from the set of bitrate options, a selection of one bitrate option,
transmitting, via the first application-agent cooperative communication control path, the selection of the one bitrate option; and
receiving, via the macro cell base station, data that is from an application server that is associated with the first user application and has a dynamically changing quality of experience (QoE) based on at least the multimedia streaming status,
wherein the state information about the first user application includes stimulus information which indicates whether a user is waiting and is about a stimulus for the request.

55. The method of claim 54, further comprising receiving, from the macro cell base station, information about capabilities of the macro cell base station for communication with the terminal node.

56. The method of claim 54, wherein the information about capabilities of the macro cell base station for communication includes information selected from the group consisting of an amount of resources available at the macro cell base station, a preferred data rate for use by the terminal node, a maximum data rate usable by the terminal node, a maximum data rate usable by the application, and a traffic rate limit.

57. The method of claim 56, wherein the traffic rate limit is selected from the group consisting of an aggregate maximum bit rate, a guaranteed bit rate, and a service level agreement.

58. The method of claim 55, wherein the information about capabilities of the macro cell base station for communication includes information about an upcoming handover of the terminal node.

59. The method of claim 54, further comprising sending, to the macro cell base station, a further request for communications from the application server via the macro cell base station, the further request having characteristics that utilize the information about capabilities of the macro cell base station for communication, wherein the characteristics include characteristics selected from the group consisting of a video format, a bit rate, and timing of the request for further communications.

60. The method of claim 59, wherein the information about capabilities of the macro cell base station for communication includes a maximum data rate currently usable by the terminal node, and wherein the characteristics include a data rate that avoids exceeding the maximum data rate.

61. The method of claim 55, wherein the terminal node further hosts a master application, and wherein the first user application receives via the master application at least a portion of the information about capabilities of the macro cell base station for communication with the terminal node.

62. The method of claim 61, wherein the master application is part of an operating system of the terminal node.

* * * * *